US012675244B2

(12) United States Patent　　(10) Patent No.:　US 12,675,244 B2

Hosogi et al.　　(45) Date of Patent:　　Jul. 7, 2026

(54) COMPUTER SYSTEM AND DATA MANAGEMENT METHOD IN STORAGE SYSTEM

(71) Applicant: Hitachi Vantara, Ltd., Yokohama (JP)

(72) Inventors: Koji Hosogi, Tokyo (JP); Kazuki Matsugami, Tokyo (JP); Mutsumi Hosoya, Tokyo (JP); Norio Shimozono, Tokyo (JP); Shinichi Hayashi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/830,735

(22) Filed: Sep. 11, 2024

(65) Prior Publication Data

US 2025/0251880 A1　　Aug. 7, 2025

(30) Foreign Application Priority Data

Feb. 5, 2024　(JP) ................................. 2024-015761

(51) Int. Cl.
G06F 3/06 　　　(2006.01)
(52) U.S. Cl.
CPC .......... G06F 3/0665 (2013.01); G06F 3/0619 (2013.01); G06F 3/067 (2013.01)
(58) Field of Classification Search
CPC ....... G06F 3/0665; G06F 3/0619; G06F 3/067

USPC .......................................................... 711/154
See application file for complete search history.

(56) References Cited

U.S. PATENT DOCUMENTS

| | | | | |
|---|---|---|---|---|
| 2017/0277443 A1* | 9/2017 | Deguchi | ............. | G06F 11/2094 |
| 2018/0314430 A1* | 11/2018 | George | ............... | G06F 12/0888 |
| 2019/0121549 A1* | 4/2019 | Satoyama | ............. | G06F 3/0688 |
| 2020/0341684 A1* | 10/2020 | Shveidel | ............. | G06F 11/1076 |
| 2020/0371704 A1* | 11/2020 | Singh | .................... | G06F 3/0608 |

FOREIGN PATENT DOCUMENTS

JP　　　　　6317524 B2　　4/2018

* cited by examiner

*Primary Examiner* — Than Nguyen
(74) *Attorney, Agent, or Firm* — Foley & Lardner LLP

(57)　　　ABSTRACT

A first storage system stores data related to execution of a first server in a logical volume, and transmits the data stored in the logical volume to a second storage system. The second storage system provides a virtual volume to the second server, and stores the data received from the first storage system in the virtual volume. The second storage system executes a process by using data stored in the virtual volume at each execution timing. Then, the second storage system determines whether the data stored in the virtual volume is left in the virtual volume or is discarded based on the presence or absence of an access and the type of access, which are access statuses to the data at each execution timing, and discards the data determined to be discarded from the virtual volume.

11 Claims, 18 Drawing Sheets

CASE WITH INDEX→RANDOM ACCESS

| A4 | REFERRING TO ONLY TARGET DATA

MASTER DATA

CUSTOMER INFORMATION

CASE WITHOUT INDEX→SEQUENTIAL ACCESS

CUSTOMER INFORMATION

FIG. 9

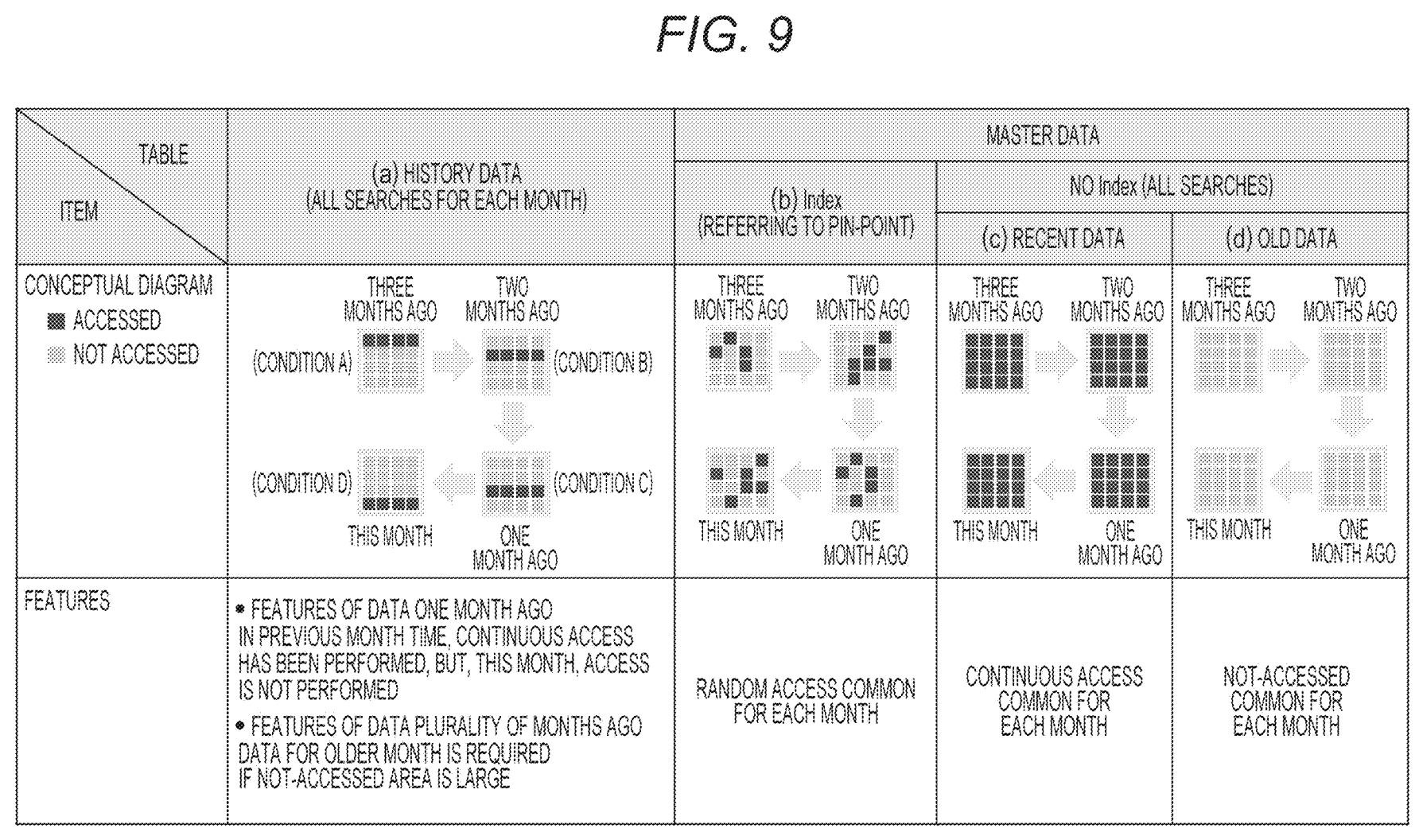

| TABLE / ITEM | (a) HISTORY DATA (ALL SEARCHES FOR EACH MONTH) | MASTER DATA | | |
| --- | --- | --- | --- | --- |
| | | (b) Index (REFERRING TO PIN-POINT) | NO Index (ALL SEARCHES) | |
| | | | (c) RECENT DATA | (d) OLD DATA |
| CONCEPTUAL DIAGRAM — ACCESSED / NOT ACCESSED | THREE MONTHS AGO → TWO MONTHS AGO (CONDITION A) → (CONDITION B) ONE MONTH AGO; (CONDITION D) THIS MONTH → (CONDITION C) | THREE MONTHS AGO → TWO MONTHS AGO → ONE MONTH AGO; THIS MONTH | THREE MONTHS AGO → TWO MONTHS AGO → ONE MONTH AGO; THIS MONTH | THREE MONTHS AGO → TWO MONTHS AGO → ONE MONTH AGO; THIS MONTH |
| | | RANDOM ACCESS COMMON FOR EACH MONTH | CONTINUOUS ACCESS COMMON FOR EACH MONTH | NOT-ACCESSED COMMON FOR EACH MONTH |
| FEATURES | • FEATURES OF DATA ONE MONTH AGO IN PREVIOUS MONTH TIME, CONTINUOUS ACCESS HAS BEEN PERFORMED, BUT, THIS MONTH, ACCESS IS NOT PERFORMED  • FEATURES OF DATA PLURALITY OF MONTHS AGO DATA FOR OLDER MONTHS IS REQUIRED IF NOT-ACCESSED AREA IS LARGE | | | |

FIG. 10

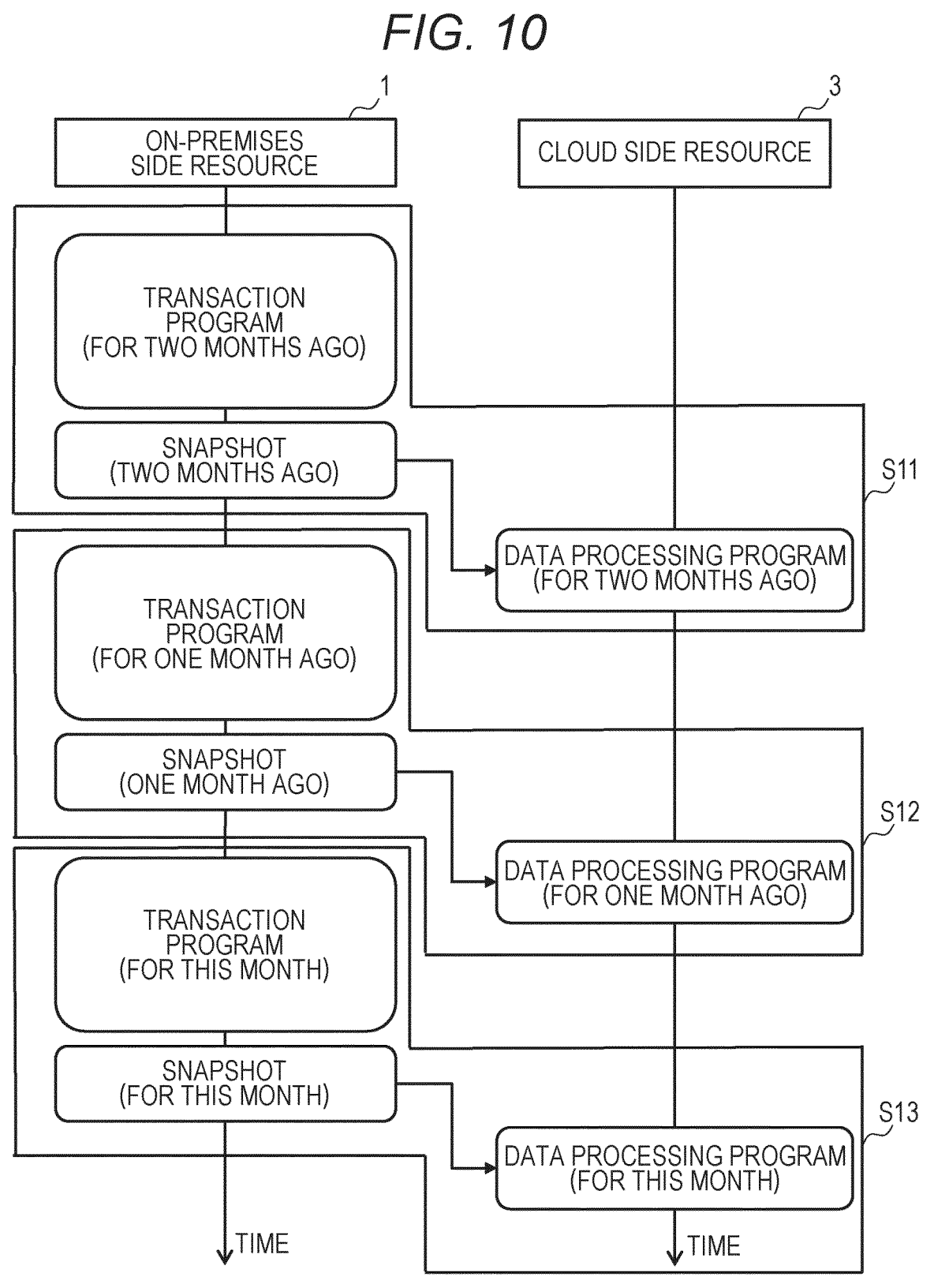

ON-PREMISES SIDE RESOURCE    1

CLOUD SIDE RESOURCE    3

TRANSACTION PROGRAM
(FOR TWO MONTHS AGO)

SNAPSHOT
(TWO MONTHS AGO)

DATA PROCESSING PROGRAM
(FOR TWO MONTHS AGO)

S11

TRANSACTION PROGRAM
(FOR ONE MONTH AGO)

SNAPSHOT
(ONE MONTH AGO)

DATA PROCESSING PROGRAM
(FOR ONE MONTH AGO)

S12

TRANSACTION PROGRAM
(FOR THIS MONTH)

SNAPSHOT
(FOR THIS MONTH)

DATA PROCESSING PROGRAM
(FOR THIS MONTH)

S13

TIME

TIME

| VOLUME ID | LOGICAL CAPACITY | ALLOCATION AMOUNT | VOLUME TYPE | ALLOCATION THRESHOLD VALUE |
|---|---|---|---|---|
| 0 | 100GB | 10GB | STANDARD VOLUME | - |
| 1 | 200GB | 20GB | SNAPSHOT VOLUME | - |
| 2 | 300GB | 10GB | VIRTUAL VOLUME | 100GB |
| ... | ... | ... | ... | |

| LOGICAL ADDRESS | PHYSICAL ADDRESS |
|---|---|
| 0x00000000 | 0 |
| 0x00000010 | 2 |
| 0x00000020 | FFFFFFFF(Invalid) |
| ... | ... |

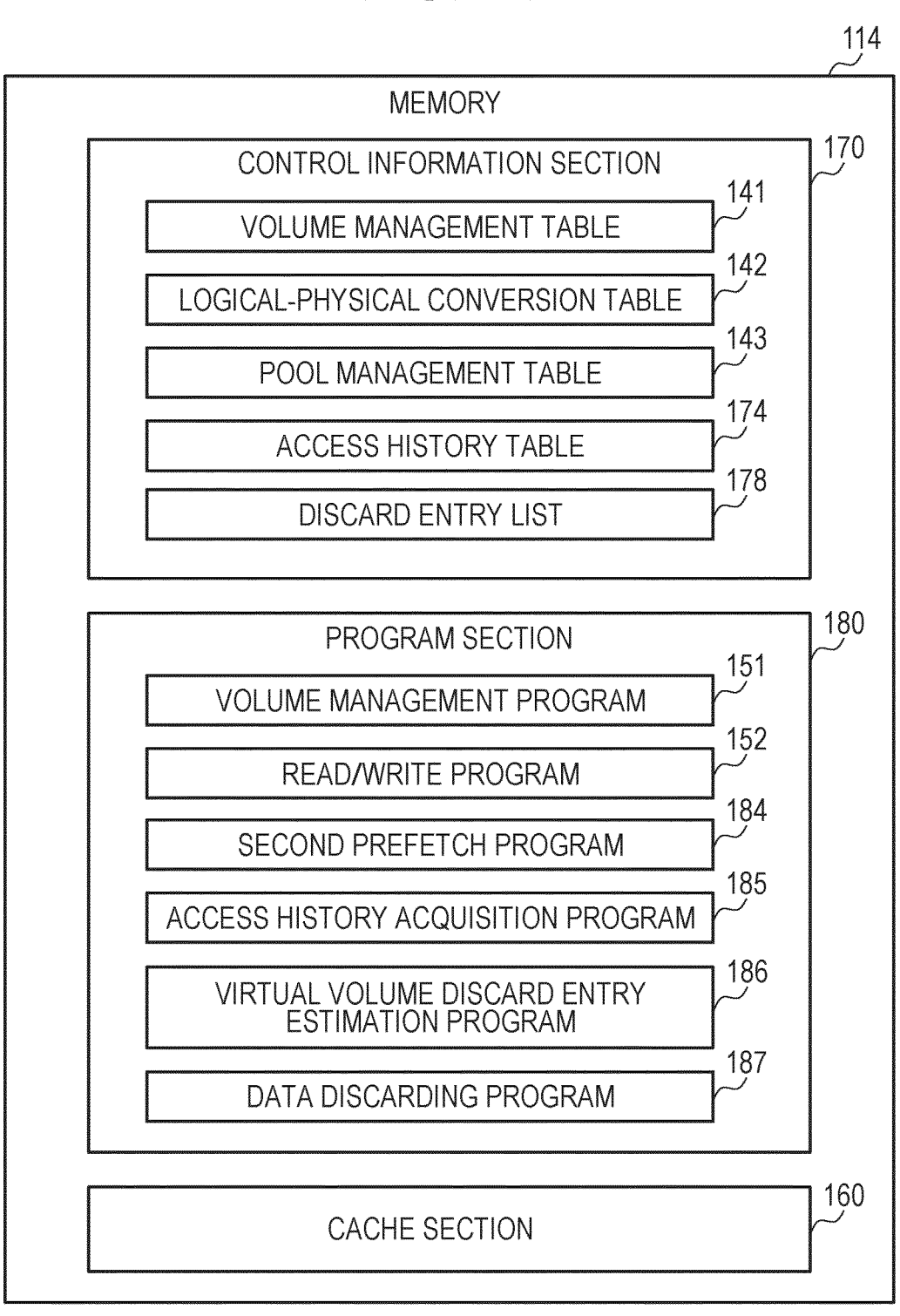

114

MEMORY

CONTROL INFORMATION SECTION — 170

VOLUME MANAGEMENT TABLE — 141

LOGICAL-PHYSICAL CONVERSION TABLE — 142

POOL MANAGEMENT TABLE — 143

ACCESS HISTORY TABLE — 174

DISCARD ENTRY LIST — 178

PROGRAM SECTION — 180

VOLUME MANAGEMENT PROGRAM — 151

READ/WRITE PROGRAM — 152

SECOND PREFETCH PROGRAM — 184

ACCESS HISTORY ACQUISITION PROGRAM — 185

VIRTUAL VOLUME DISCARD ENTRY ESTIMATION PROGRAM — 186

DATA DISCARDING PROGRAM — 187

CACHE SECTION — 160

| LOGICAL BLOCK [N] | LOGICAL BLOCK [N+1] | STATE OF LOGICAL BLOCK N |
|---|---|---|
| NOT-ACCESSED | NOT-ACCESSED | NOT-ACCESSED BLOCK ("0") |
| NOT-ACCESSED | ACCESSED | RANDOM BLOCK ("1") |
| ACCESSED | NOT-ACCESSED | RANDOM BLOCK ("1") |
| ACCESSED | ACCESSED | CONTINUOUS BLOCK ("2") |

| 176A [FOR TWO MONTHS AGO] | 176B [FOR ONE MONTH AGO] | 176C [FOR THIS MONTH] | | |
|---|---|---|---|---|
| | | NOT-ACCESSED BLOCK | RANDOM BLOCK | CONTINUOUS BLOCK |
| NOT-ACCESSED BLOCK | NOT-ACCESSED BLOCK | HISTORY (a) THREE MONTHS AGO OR MASTER DATA (d) ⇒CORRESPONDING TO (CONDITION A) | MASTER DATA (b) | THIS MONTH HISTORY DATA (a) OR MASTER DATA (c) ⇒CORRESPONDING TO (CONDITION D) |
| | RANDOM BLOCK | MASTER DATA (b) | MASTER DATA (b) | MASTER DATA (b) |
| | CONTINUOUS BLOCK | HISTORY (a) ONE MONTH AGO OR MASTER DATA (b) ⇒CORRESPONDING TO (CONDITION C) | MASTER DATA (b) | MASTER DATA (c) |
| RANDOM BLOCK | NOT-ACCESSED BLOCK | MASTER DATA (b) | MASTER DATA (b) | MASTER DATA (b) |
| | RANDOM BLOCK | MASTER DATA (b) | MASTER DATA (b) | MASTER DATA (b) |
| | CONTINUOUS BLOCK | MASTER DATA (b) | MASTER DATA (b) | MASTER DATA (c) |
| CONTINUOUS BLOCK | NOT-ACCESSED BLOCK | HISTORY (a) TWO MONTHS AGO OR MASTER DATA (b) ⇒CORRESPONDING TO (CONDITION B) | MASTER DATA (b) | MASTER DATA (b) |
| | RANDOM BLOCK | MASTER DATA (b) | MASTER DATA (b) | MASTER DATA (b) |
| | CONTINUOUS BLOCK | MASTER DATA (b) | MASTER DATA (b) | MASTER DATA (c) |

COMPUTER SYSTEM AND DATA MANAGEMENT METHOD IN STORAGE SYSTEM

BACKGROUND OF THE INVENTION

1. Field of the Invention

The present invention relates to a computer system and a data management method in a storage system.

2. Description of the Related Art

In recent years, there has been an increasing need for a batch process, and secondary use such as data utilization using the results of online transaction processes, or the like, in addition to online transactions operating on-premises.

It is conceivable that a process using a result of an online transaction process is executed on-premises. In this case, in addition to computing resources and storage resources at a level at which the responsiveness of the online transaction is not deteriorated, computing resources and storage resources for the batch process and the secondary use are required. As a result, regarding these resources, an amount of resources that allows stable operation even at the maximum load is required, and the cost becomes high.

For this problem of high cost, a hybrid cloud that reduces the amount of resources on the on-premises side may be used by offloading computing resources and storage resources related to the batch process and the secondary use to a cloud and performing distributed processing. In a hybrid cloud environment, data generated by an online transaction process executed on the on-premises side can be transferred to the cloud side. In such a use method, it is necessary to duplicate and retain the data on the on-premises side and the cloud side.

Regarding such a method of retaining duplicated data, for example, in Japanese Patent No. 6317524, a method in which all pieces of data are retained on the cloud side, and data having a low access frequency on the on-premises side is discarded from the on-premises in order to reduce the data retention amount on the on-premises side is adopted. As a result, it is possible to reduce the cost on the on-premises side. In addition, in this method, in a case where the access frequency to data that has been already discarded on the on-premises side increases, data is transmitted from the cloud side to the on-premises side, thereby improving data responsiveness on the on-premises side.

Here, in a case where data is retained on the cloud side, it is necessary to allocate a storage on the cloud side (cloud storage below). In the cloud storage, billing occurs in proportion to the allocated capacity and time. Thus, in a case where the capacity of the cloud storage is large or in a case where the cloud storage is retained for a long period, the cost of the cloud becomes high.

In addition, in a case where the access frequency of data that has been already discarded on the on-premises side increases, data is transmitted from the cloud side to the on-premises side. In general cloud use, data input from the outside to the cloud is not charged, but data is charged in a case where the data is output from the cloud, which also causes an increase in cost.

As described above, in the method disclosed in Japanese Patent No. 6317524, an increase in cost becomes a problem.

The present invention has been made in view of the above circumstances, and an object of the present invention is to reduce the cost of a cloud in retaining data on an on-premises side and the cloud side.

SUMMARY OF THE INVENTION

According to an aspect of the present invention, a computer system includes a first storage system that is disposed in a first base and provides a logical volume to a first server, and a second storage system that is disposed in a second base and is connected to the first storage system via a network, in which the first storage system includes a first processor and a memory, the second storage system includes a second processor and a memory, the first processor stores data related to execution of the first server in the logical volume, and transmits the data stored in the logical volume to the second storage system, and the second processor provides a virtual volume to a second server by the second storage system, stores the data received from the first processor in the virtual volume, executes a process by using the data stored in the virtual volume at each execution timing, determines whether the data stored in the virtual volume is left in the virtual volume or discarded based on presence or absence of an access and a type of access which are access statuses to the data at each execution timing, and discards the data determined to be discarded from the virtual volume.

According to the present invention, it is possible to reduce the cost of a cloud in retaining data on an on-premises side and the cloud side.

BRIEF DESCRIPTION OF THE DRAWINGS

FIG. 9 is a diagram illustrating access features of history data and master data according to the embodiment;

FIG. 10 is a diagram for explaining a time chart of execution of the transaction program and the data processing program according to the embodiment;

FIG. 12 is a diagram for explaining a storage volume management table according to the embodiment;

FIG. 13 is a diagram for explaining a logical-physical conversion table according to the embodiment;

FIG. 14 is a diagram for explaining data retained in a memory in the second storage system according to the embodiment;

FIG. 18 is a diagram for explaining a processing function of continuous/random estimation according to the embodiment;

FIG. 19 is a diagram for explaining a processing function of history data/master data estimation according to the embodiment;

DESCRIPTION OF THE PREFERRED EMBODIMENTS

Figure 1:
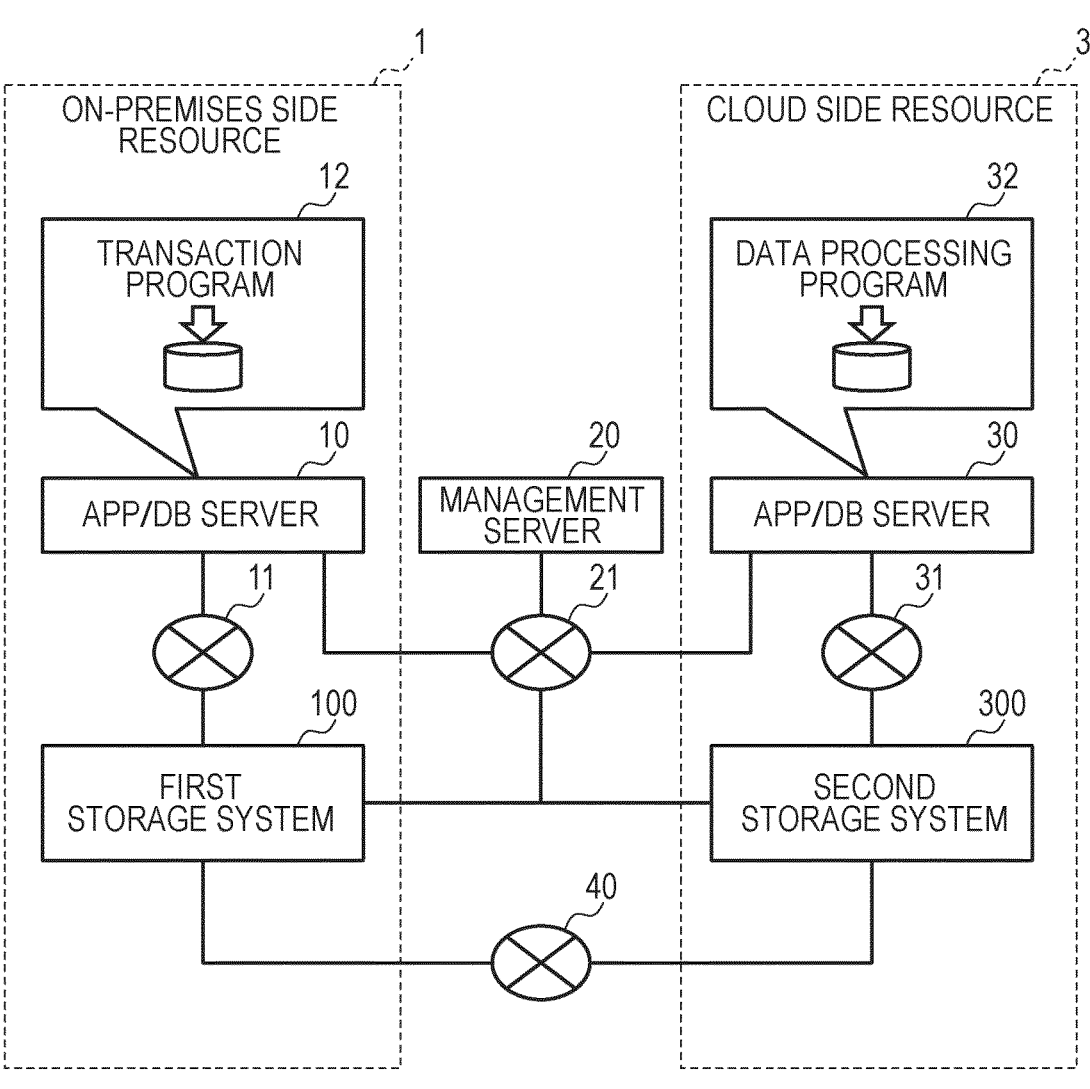
FIG. 1 is a block diagram illustrating a configuration example of a hybrid cloud system according to an embodiment.

Hereinafter, embodiments of the present invention will be described in detail with reference to the drawings. The following description and drawings are examples for describing the present invention, and will include omissions and simplifications as appropriate for clarity of description. In addition, not all combinations of features described in the embodiments are essential to the solution of the invention. The present invention is not limited to the embodiments, and all application examples consistent with the idea of the present invention are included in the technical scope of the present invention. Those skilled in the art can make various additions, modifications, and the like to the present invention within the scope of the present invention. The present invention can be realized in various other forms. Unless otherwise specified, each component may be plural or singular.

In the following description, a "central processing unit (CPU)" is an example of one or more processor devices. Typically, the at least one processor device is not limited to the CPU, and may be another type of processor device such as a graphics processing unit (GPU). The at least one processor device may be a single core or a multi-core. The at least one processor device may be a processor core.

The at least one processor device may be a circuit that is an assembly of gate arrays in a hardware description language that performs some or all of processes. The circuit is, for example, a processor device in a broad sense such as a field-programmable gate array (FPGA), a complex programmable logic device (CPLD), or an application specific integrated circuit (ASIC).

In the following description, a process may be described mainly by a "yyy program". In this case, the program is executed by the CPU to realize a processing function called "yyy functional unit", and serves as a processing execution subject. The processing function may be realized by a processor executing one or more computer programs, may be realized by one or more hardware circuits (for example, FPGA or ASIC), or may be realized by a combination thereof.

In a case where the function is realized by the processor executing the program, a determined process is appropriately executed by using a storage device and/or an interface device, and thus, the function may be at least a part of the processor. The process described with the functional unit as the subject may be a process executed by a processor or a device including the processor.

The program may be installed from a program source. The program source may be, for example, a program distribution computer or a computer-readable recording medium (for example, a non-transitory recording medium). The description of each function is an example, and a plurality of functions may be integrated into one function or one function may be divided into a plurality of functions. The "yyy functional unit" may be referred to as a "yyy unit".

In the following description, various types of information may be described in a table format, and the data format of the information may be a format other than the table format (for example, comma separated values (CSV) format or the like). Various types of information may be stored in a storage unit as a table, or may be embedded as logics in a program.

In the following description, among the reference numerals, common reference numerals are used in a case where the same type of elements are denoted without being distinguished from each other, and reference numerals are used in a case where the same kind of elements are denoted while being distinguished from each other.

Configuration of Hybrid Cloud System S According to Embodiment

FIG. 1 is a block diagram illustrating a configuration example of a hybrid cloud system S according to an embodiment.

In the hybrid cloud system S, an on-premises side resource 1, a cloud side resource 3, and a management server 20 that manages these resources are connected to a network 21 via a network 40. The on-premises side is a first base. The cloud side is a second base. The cloud side resource 3 is assumed to be a public cloud environment, but is not limited thereto.

In the on-premises side resource 1, an APP/DB server 10 and a first storage system 100 are connected via a network 11. The APP/DB server 10 is a server that executes a transaction program 12 for processing an online transaction. The first storage system 100 stores data on the on-premises and controls I/O issued by the APP/DB server 10. The APP/DB server 10 is an example of a first server. The transaction program 12 is an example of a first program executed by the first server.

Similarly, in the cloud side resource 3, an APP/DB server 30 and a second storage system 300 are connected via a network 31. The APP/DB server 30 is a server that processes a batch process and a secondary use process. The second storage system 300 stores data on the cloud side and controls I/O issued by the APP/DB server 30. The APP/DB server 30 is an example of a second server.

The batch process and the secondary use process are collectively referred to as a data processing program 32 in the sense of performing database processing and data formation with, as an input, data generated by an online program process. The data processing program 32 is an example of a second program executed by the second server.

The management server 20 is connected to the APP/DB server 10, the first storage system 100, the APP/DB server 30, and the second storage system 300 via the network 21. The management server 20 is connected to perform initial setting and management of the server and the storage system. Currently, this setting and management function may be substituted by an infrastructure management function or a deployment automation function such as Kubernetes.

The management server 20 is disposed on one or both of the on-premises side and the cloud side. This means that the connected resources are integrally managed, and the disposition place is not limited in the present embodiment.

The first storage system 100 and the second storage system 300 are connected to each other via a network 40 to form a path of data transfer between the first storage system 100 and the second storage system 300. A system including at least the first storage system 100 and the second storage system 300 connected via the network 40 is an example of a computer system.

(Configurations of First Storage System 100 and Second Storage System 300)

Figure 2:
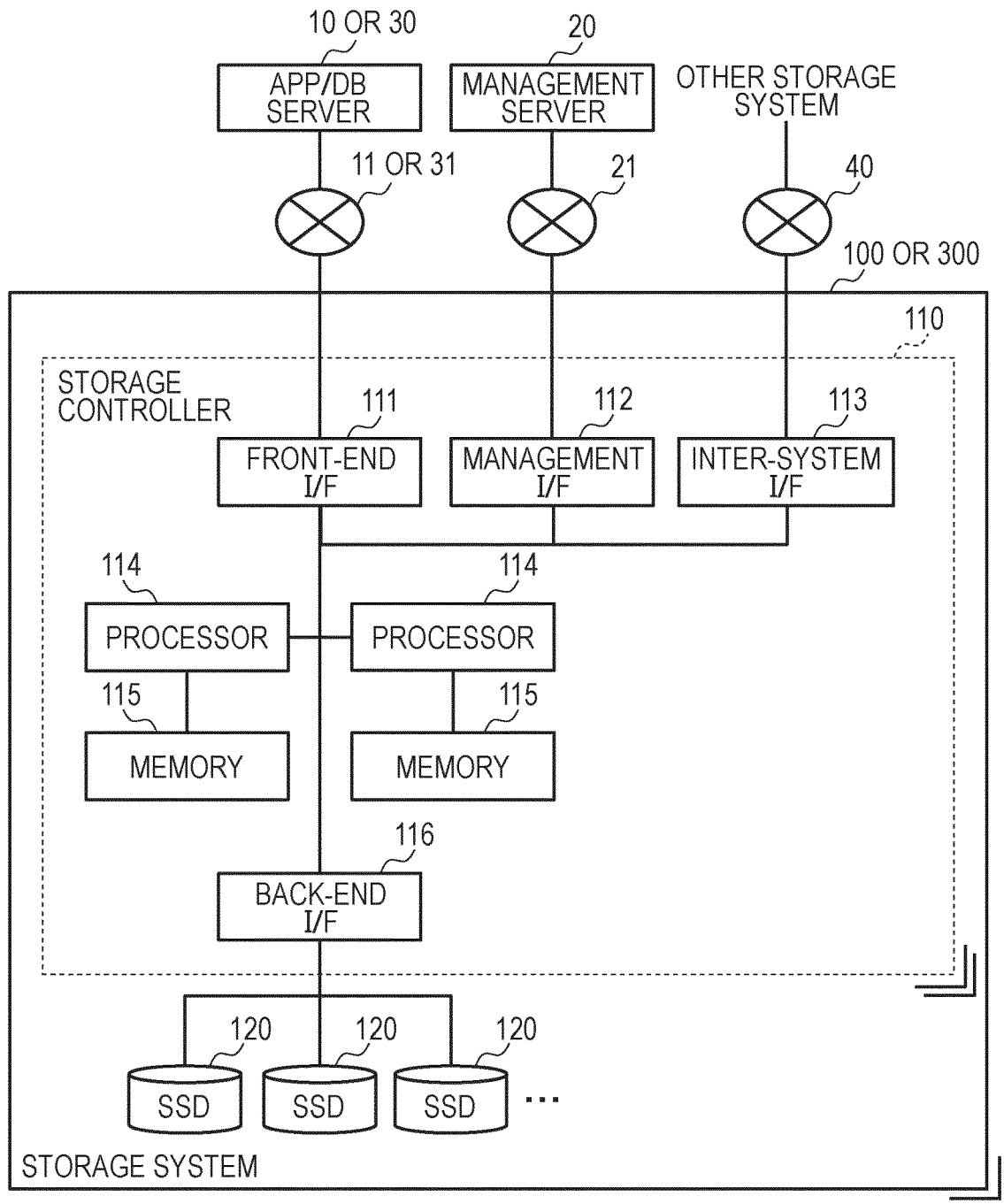
FIG. 2 is a block diagram illustrating a hardware configuration example of a first storage system and a second storage system according to the embodiment.

FIG. 2 is a block diagram illustrating a hardware configuration example of the first storage system 100 and the second storage system 300 according to the embodiment. Here, in order to facilitate the description, a general configuration is disclosed, but the present invention is not limited thereto.

The first storage system 100 and the second storage system 300 are configured to include a storage controller 110 and a plurality of SSDs 120. The storage controller 110 includes a plurality of processors 114, a memory 115, a front-end I/F 111, and a back-end I/F 116. The front-end I/F 111 is an interface of I/O issued by the APP/DB server 10. The back-end I/F 116 is a connection interface with the SSD 120. The first storage system 100 and the second storage system 300 execute storage functions such as a general I/O process by these resources.

A management I/F 112 is an interface with the management server 20. An inter-system I/F 113 is connected to the other storage system via the network 40 to form a data transfer path between the first storage system 100 and the second storage system 300.

In the present embodiment, the first storage system 100 and the second storage system 300 will be described as the same hardware configuration, but this is to facilitate the description, and the present invention is not limited to these configurations.

(Functions of First Storage System 100 and Second Storage System 300)

Figure 3:
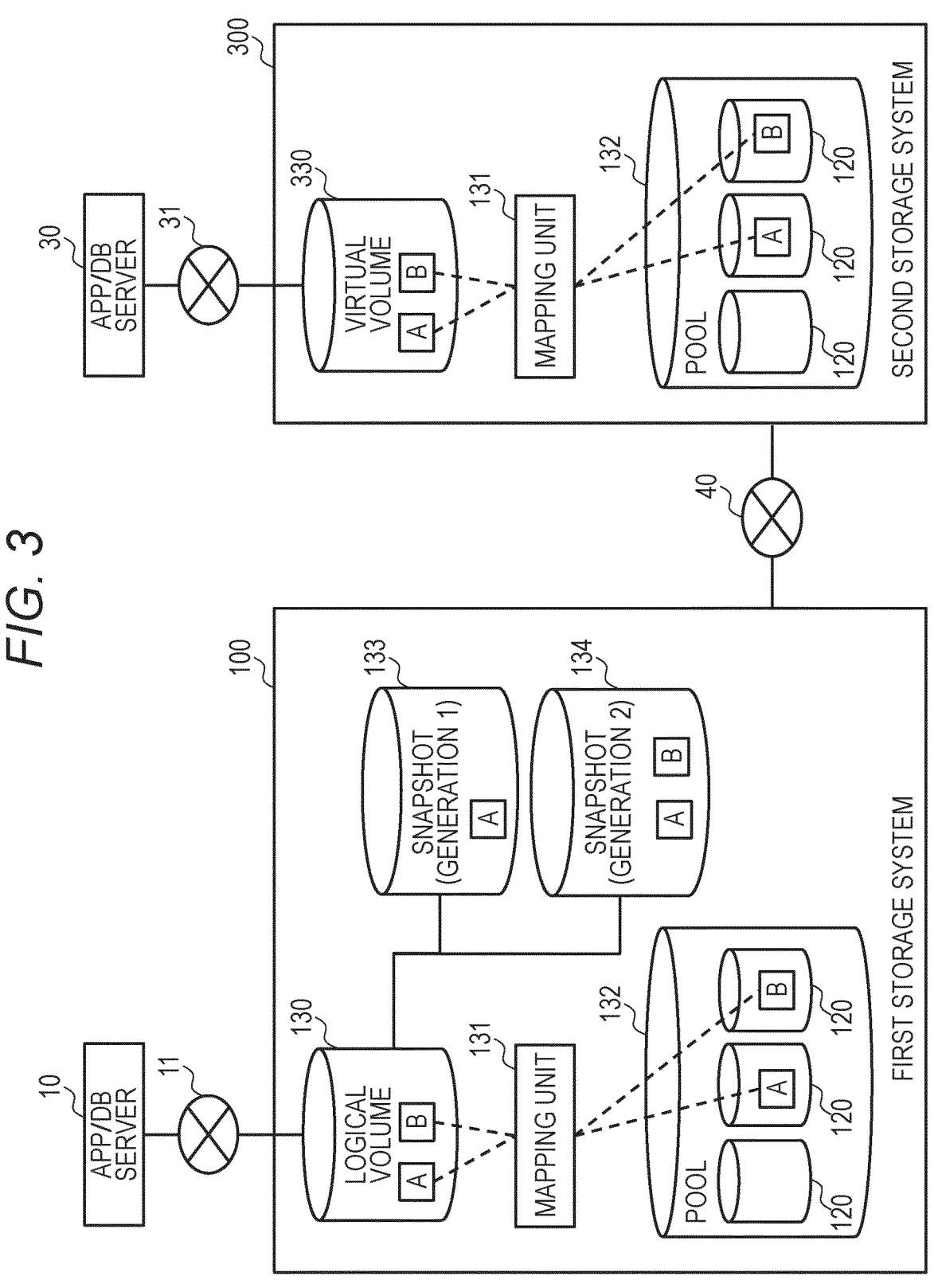
FIG. 3 is a diagram for explaining storage functions of the first storage system and the second storage system according to the embodiment.

FIG. 3 is a diagram for explaining storage functions of the first storage system 100 and the second storage system 300 according to the embodiment.

In the first storage system 100, a logical volume 130 and a physical pool 132 are disposed. The logical volume 130 is a volume provided to the APP/DB server 10. A mapping unit 131 performs mapping between the logical volume 130 and the physical pool 132.

The SSD 120 is mapped on the physical pool 132. For example, a specific block of the SSD 120 in the physical pool 132 is allocated to a logical block A in the logical volume 130 by the mapping unit 131. As a result, the logical block A is physically retained, and actual data in the physical pool 132 can be accessed by this mapping with respect to an access from the APP/DB server 10. The logical volume 130 has a configuration in which all pieces of data in a defined volume are allocated.

The first storage system 100 has a configuration capable of retaining a snapshot of a physical pool and mapping information at a designated time. For example, a configuration capable of retaining a plurality of snapshots such as a snapshot (Generation 1) 133 at a designated time (Generation 1) and a snapshot (Generation 2) 134 at a designated time (Generation 2) is assumed.

For example, it is conceivable that the write of a logical block B has occurred in the logical volume 130 after the specified time (Generation 1), and then a snapshot is generated as the specified time (Generation 2). In this case, the snapshot (Generation 2) 134 is a snapshot in which only the logical block B is updated.

In the second storage system 300, a virtual volume 330, a mapping unit 131, and a physical pool 132 are disposed. The virtual volume 330 is a volume to which some pieces of data in a defined volume in the first storage system 100, such as the logical volume 130 and the snapshot 133, is allocated. The virtual volume 330 is provided as a virtual storage to the APP/DB server 30. The mapping unit 131 and the physical pool 132 are equivalent to the functions in the first storage system 100.

The first storage system 100 and the second storage system 300 perform data transfer via the network 40.

Here, the logical volume 130 of the first storage system 100 is a volume in which a volume type 1414 to be described later is defined as a standard volume. The virtual volume 330 is a volume in which the volume type 1414 is defined as a virtual volume.

In the present embodiment, it is assumed that resources having the same name in the first storage system 100 and the second storage system 300 have equivalent functions. This is to facilitate the description of the concept of the present embodiment, and does not limit differences regarding detailed functions. Although the snapshot function of a storage function of the second storage system 300 is not mentioned, this is also for facilitating the description, and there is no limitation as to whether or not the second storage system 300 has the snapshot function.

Next, an example of the transaction program 12 executed on the on-premises side and the data processing program 32 executed on the cloud side in the present embodiment will be described. The program assumed in the present embodiment is the transaction program on the on-premises side and the data processing program on the cloud side, but is not limited thereto.

Transaction Program According to Embodiment

Figure 4:
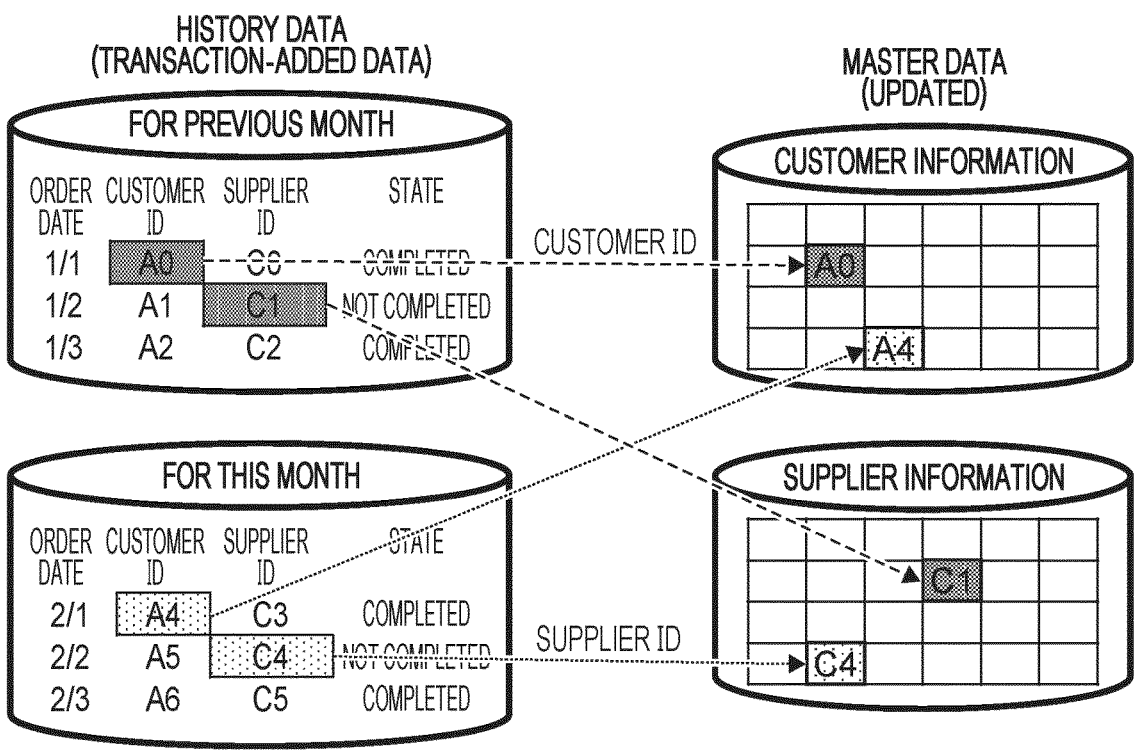
FIG. 4 is a diagram for explaining an example of a transaction program executed on an on-premises side according to the embodiment.

FIG. 4 is a diagram for explaining an example of the transaction program executed on the on-premises side according to the embodiment.

A general transaction program uses a database. For example, a standard accounting program in which a customer having a customer ID of A0 illustrated in FIG. 4 places an order to a supplier having a supplier ID of C0 is assumed. Data in this case is configured to include master data in which a large amount of customer information and supplier information are stored, and history data in which a transaction is additionally written and retained for each order. The history data is continuously accessed. The master data is randomly accessed.

As illustrated in FIG. 4, each row of the history data is expressed by including columns such as an order date, a customer ID, a supplier ID, and a state (state of each order such as order completion, delivery completion, payment completion, and the like). The data structure of the transaction program is a model that refers to a target row of the master data associated with the history data by using the customer ID and the supplier ID. In the data structure in such a transaction program, the master data is determined in advance, and the history data is additionally written for each daily transaction.

Here, the master data has a structure in which data for each customer ID discretely arranged is referred to for association reference. In addition, in the history data, logical division called partition is used. The partition is to divide one table on a defined basis, and for example, is to divide history data in units of one month. By using the partition, data portability can be improved to perform backup in a unit of partition. In addition, for example, by referring to data divided by partitions in units of one month by a monthly batch process or the like, all search targets in a database process can be minimized, and processing performance can be improved.

(Logical Image and Physical Image in Transaction Program)

Figure 5:
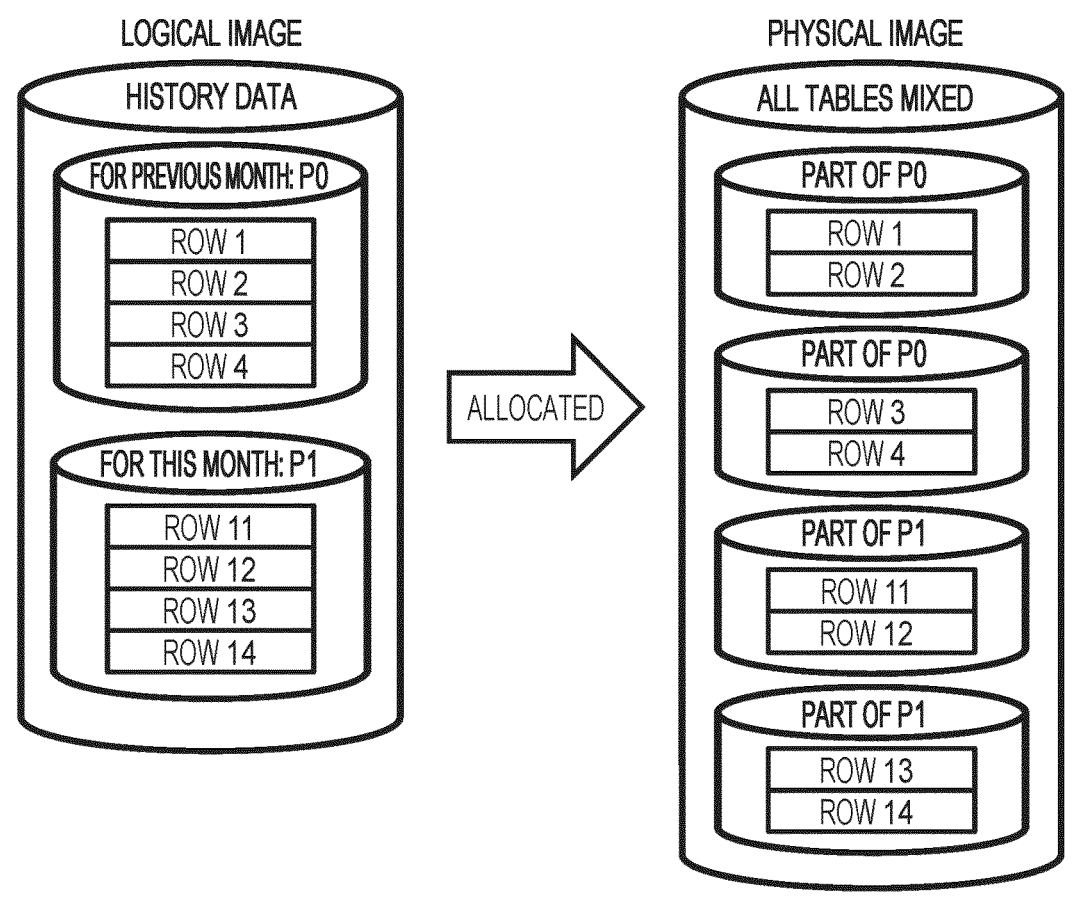
FIG. 5 is a diagram for explaining a logical image and a physical image in the transaction program according to the embodiment.

FIG. 5 is a diagram for explaining a logical image and a physical image in the transaction program according to the embodiment. As illustrated in the left diagram of FIG. 5, history data in the transaction program is additionally written for each transaction. In the additional writing in the database, a physical area in the volume is not allocated for each row, but a physical area in an allocation unit sufficiently larger than a row data size is allocated in advance by an engine in the database. The allocation unit in the pre-allocation is a table unit or a partition unit. Thus, in each transaction, a structure in which data is sequentially added in the allocation unit is made, and in the table or partition unit, the same table or partition data is continuously arranged at least in the allocation unit.

The history data newly added has been described above. However, in a normal database, an update process of each row is also executed. For example, in the history data, state information such as order completion, delivery completion, and payment completion illustrated in FIG. 5 is updated. The update in the database includes a method of updating the target row, a method of invalidating the target row and additionally writing the correction data again, and the like.

Regarding the master data, customer information and the like may also be updated. In the database, data rearrangement or the like occurs by a cleaning process of an invalid data area called defragmentation. As a result, each table may be frequently updated.

Features of Data Referred to by Transaction Program According to Embodiment

Figures 6, 7:
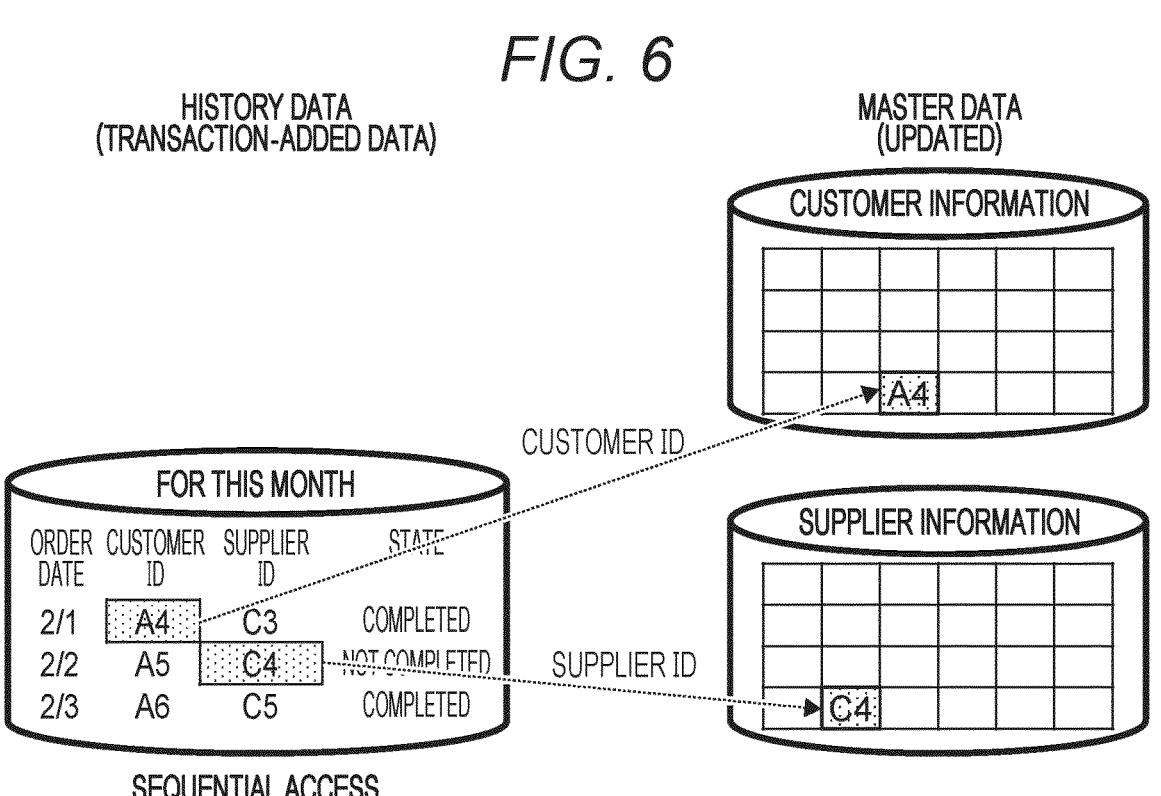
FIG. 6 is a diagram for explaining features of data referred to by the transaction program according to the embodiment.
FIG. 7 is a diagram for explaining features of data referred to by a data processing program according to the embodiment.

FIG. 6 is a diagram for explaining features of data referred to by the transaction program according to the embodiment.

In a general data processing program such as monthly batch, a data flow in which data obtained by processing and molding each transaction added, for example, issuing of an invoice is output is generally used. In this case, the transaction program makes a data flow in which the added history data and the master data associated with the history data are referred to. In particular, in the case of history data partitioned on a monthly basis, month data divided by the target partition is referred to. Thus, a sequential access is performed in a unit of partition.

Features of Data Referred to by Data Processing Program According to Embodiment

FIG. 7 is a diagram for explaining features of data referred to by the data processing program according to the embodiment.

In a case of referring to the master information associated with the history data, the data processing program logically accesses only the data row associated with the target ID. However, it is necessary to consider an index in the database. As the index, a technique of shortening an access time by directly referring to only a specific row in the table is used. For this index, an index table needs to be generated in advance. On the other hand, in a case where the index is not used, it is not possible to directly refer to a specific row of the master data. In this case, a flow of entirely searching the master data in advance is made. Thus, regarding the master data, a discrete random access or a sequential access by full search may be mixed.

Data Contents According to Embodiment

Figures 8A, 8B, 8C:
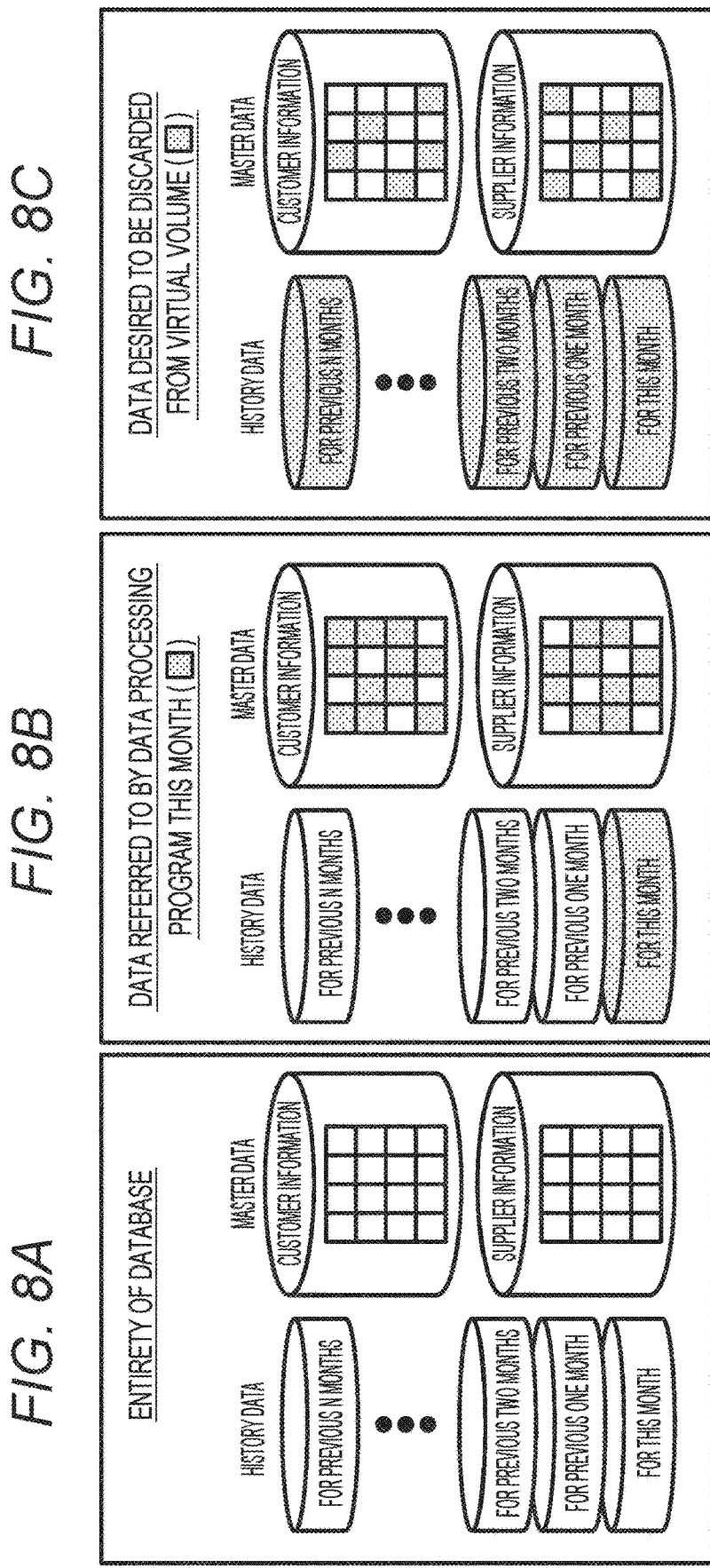
FIGS. 8A to 8C are image diagrams for explaining data contents according to the embodiment.

FIGS. 8A to 8C are image diagrams for explaining data contents according to the embodiment.

FIG. 8A illustrates data contents of the entire database including the history data and the master data. The history data is configured to include data for (N+1) months (N is an integer of 2 or more).

The latest history data for this month is data newly stored during this one month by the transaction program 12. Similarly, the history data one month ago is history data stored in the one previous month. The history data is configured by a plurality of months. The master data is substantially static data except for some updates. Data of the entire database is stored in the first storage system 100 in the on-premises side resource 1.

FIG. 8B is a diagram for explaining data referred to by the data processing program 32 (illustrated by hatching in FIG. 8B). Regarding the history data, only data newly stored during this one month by the transaction program 12 is referred to. That is, history data prior to one month ago is not referred to. Regarding the master data, as described with reference to FIG. 7, in a case where there is an index, only a part of data associated from the history data is referred to. As described above, the data processing program 32 partially refers to the database instead of referring to the entire database in a case of referring to data of this month. According to the operation of the data processing program 32, the second storage system 300 does not need to retain data of the entire database.

As a result, by actively discarding data not referred to in the second storage system 300, it is possible to reduce the capacity of the SSD allocated to the cloud side and to reduce cloud storage charging. Therefore, in the present embodiment, unnecessary data is discarded from the virtual volume 330.

FIG. 8C is a diagram for explaining data (illustrated by hatching in FIG. 8C) to be discarded from the virtual volume 330 on the cloud side. All pieces of the history data become unnecessary when the data processing program 32 ends the data storage of this month, it is desirable to discard all the pieces of history data. In the master data, data that has not been referred to by the data processing program 32 for this one month is highly likely not to be referred to in the future, and thus it is desirable to discard these pieces of data as well. As described above, the features of the data intended to be discarded are different between the history data and the master data.

Here, the data processing program 32 operates via a relational database system (RDBS), and the data processing program 32 and the RDBS allow recognition of the logical block positions of the history data and the master data. Since these pieces of information can be accessed only by the kernel authority, there is a problem that the second storage system 300 cannot recognize the logical block positions of the history data and the master data without cooperation with the data processing program 32 and the RDBS.

Access Features of History Data and Master Data According to Embodiment

FIG. 9 is a diagram illustrating access features of history data and master data according to the embodiment. FIG. 9 illustrates areas to which the data processing program 32 refers at times of three months ago, two months ago, one month ago, and this month.

First, (a) history data will be described. The data processing program 32 has continuously accessed an area corresponding to the first row of an area region exemplified by the 4×4 matrix three months ago (Condition A). In addition, the data processing program 32 has continuously accessed an area corresponding to the second row of an area exemplified by the 4×4 matrix two months ago (Condition B). In addition, the data processing program 32 has continuously accessed an area corresponding to the third row of an area exemplified by the 4×4 matrix one month ago (Condition C). In addition, the data processing program 32 has continuously accessed an area corresponding to the fourth row of an area exemplified by the 4×4 matrix this month (Condition D).

As described above, the history data has a feature of being continuously accessed, but being exclusively accessed by the data processing program 32 every month. In addition, an access is made one month ago, whereas not-access occurs this month. This behavior is different from a general least recently used (LRU) behavior.

Next, the master data will be described. In a case where indexes of the database are set in advance, any of three months ago, two months ago, one month ago, and this month are randomly accessed. On the other hand, in a case where indexing setting is not performed, the continuous access occurs all of three months ago, two months ago, one month ago, and this month. However, the not-access may occur all of three months ago, two months ago, one month ago, and this month due to old data, garbage collection by the database, or the like.

As described above, it can be seen that the reference features of the history data and the master data are different.

Time Chart of Execution of Program According to Embodiment

FIG. 10 is a diagram for explaining a time chart of execution of the transaction program 12 and the data processing program 32 according to the embodiment.

First, in Step S11, the CPU of the APP/DB server 10 of the on-premises side resource 1 executes the transaction program 12 for two months ago. Then, at the end of the month two months ago, the CPU of the APP/DB server 10 acquires and stores a snapshot (for two months ago) of the database accumulated by execution of the transaction program 12 for two months ago. Then, the cloud side resource 3 executes the data processing program 32 corresponding to two months ago by using the stored snapshot (for two months ago).

After the snapshot is stored in Step S11, in Step S12, as in Step S11, the transaction program 12 corresponding to one month ago is executed, and a snapshot (corresponding to one month ago) at the end of the month one month ago is acquired. Then, the data processing program 32 using the snapshot (for one month ago) is executed.

After the snapshot is saved in Step S12, in Step S13, processes similar to those in Steps S11 and S12 are executed for this month. As described above, in units of months, from (N+1) months ago to this month, the transaction program 12 and the snapshot acquisition in the on-premises side resource 1 and the data processing program 32 in the cloud side resource are sequentially executed in parallel.

Data Retained in First Storage System 100 According to Embodiment

Figure 11:
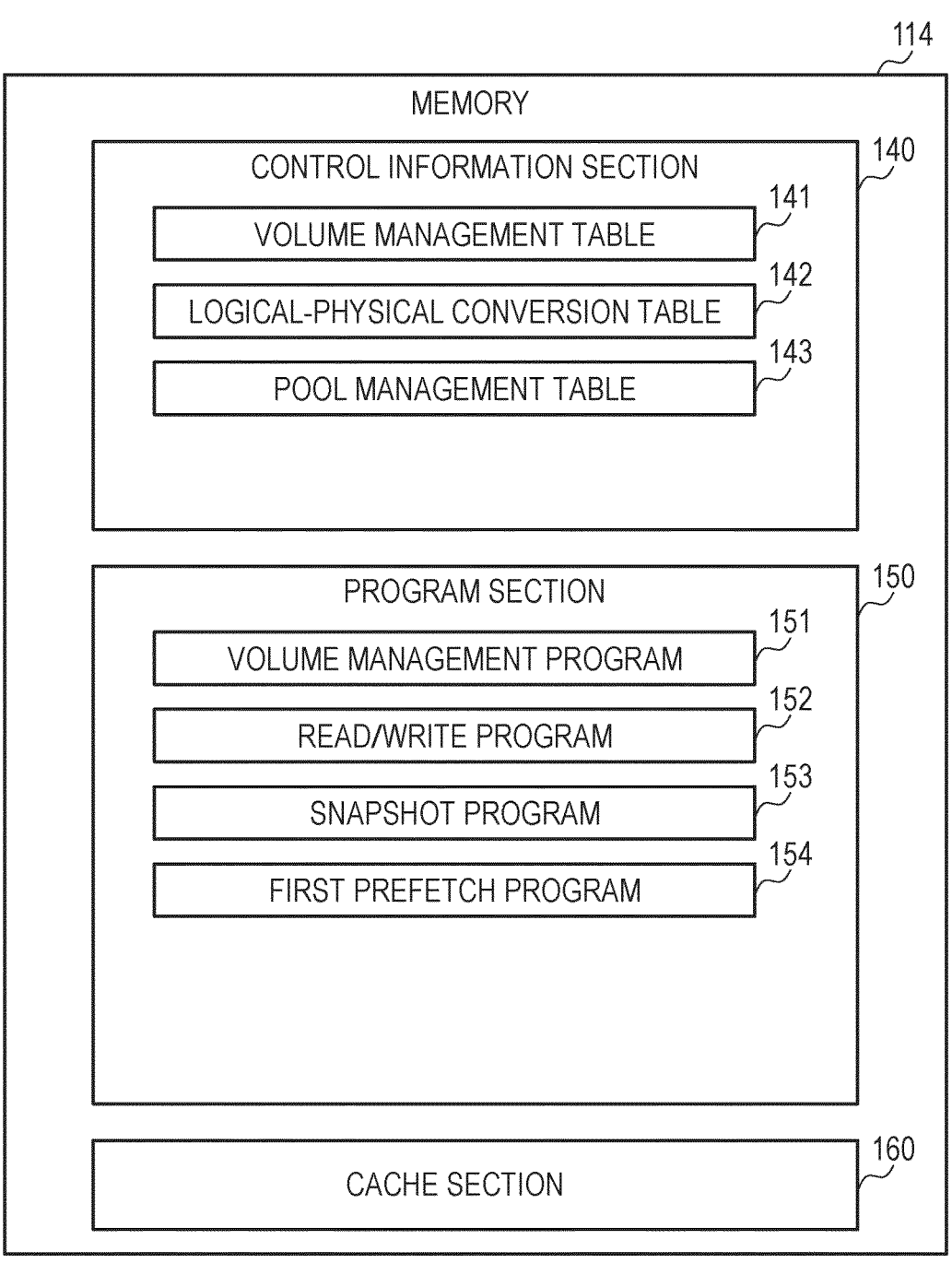
FIG. 11 is a diagram for explaining data retained in a memory in the first storage system according to the embodiment.

FIG. 11 is a diagram for explaining data retained in the memory 115 in the first storage system 100 according to the embodiment. The memory 115 includes a control information section 140, a program section 150, and a cache section 160.

The control information section 140 includes a flag, an address, and the like for performing storage control. The program section 150 stores storage control contents as software. In the program section 150, details of a volume management program 151, a read/write program 152, a snapshot program 153, and a first prefetch program 154 will be described later.

The cache section 160 improves I/O performance by temporarily retaining I/O data from a host (not illustrated) to the first storage system 100. The cache section 160 is a cache memory of a general storage system.

A pool management table 143 in the control information section 140 is a table configured by data having a width of 1 bit or more with a physical address as an index. For example, "O" is set in a case where a target physical address is unallocated, and "1" is set in a case where the target physical address is allocated. By referring to the pool management table 143, it can be determined whether or not the physical address in the SSD 120 has been allocated.

Volume Management Table 141 According to Embodiment

FIG. 12 is a diagram for explaining a volume management table 141 according to the embodiment. The volume management table 141 has columns of a volume ID 1411, a logical capacity 1412, an allocation amount 1413, a volume type 1414, and an allocation threshold value 1415. The volume ID 1411 is information for identifying a volume in the first storage system 100. The logical capacity 1412 is a logical capacity of the volume identified by the volume ID 1411. The allocation amount 1413 is an amount of data actually allocated to the volume identified by the volume ID 1411. The volume type 1414 indicates the type of volume identified by the volume ID 1411. The allocation threshold value 1415 will be described later.

In the volume type 1414, at least three types of volume types are indicated. The first volume type is a normal volume and is "standard volume" meaning the logical volume 130 (FIG. 3). The standard volume is a normal volume instructed to be generated by the APP/DB server 10 or the management server 20. "Snapshot volume" that is the second volume type is the snapshot 133 or 134 (FIG. 3). "Virtual volume" that is the third volume type is the virtual volume 330 (FIG. 3).

As described above, a plurality of different volumes are formed in the storage in accordance with the volume type 1414. In addition, the allocation threshold value 1415 is defined only in a case where the volume type is a virtual volume. This is the data capacity actually allocated in the volume. For example, in a case where the logical capacity 1412 is 300 GB and the allocation threshold value 1415 is 100 GB, it means that only 100 GB of 300 GB being the logical capacity is allocated to the virtual volume 330.

In the present embodiment, these three types of volume types will be described, but other volume types may be provided.

Logical-Physical Conversion Table 142 According to Embodiment

FIG. 13 is a diagram for explaining a logical-physical conversion table 142 according to the embodiment. The logical-physical conversion table 142 is configured to include a logical address 1421 and a physical address 1422. The logical-physical conversion table 142 is used for mapping by the mapping unit 131, and associates logical blocks with physical blocks. Here, in the logical-physical conversion table 142, a table is created for each volume ID 1411 (FIG. 13) described above. By retaining an unallocated state (INVALID) such as FFFFFFFF in the physical address, it is indicated that the target logical address is unallocated.

The pool management table 143 will be described. The pool management table 143 is a table configured by data having a width of 1 bit or more with a physical address as an index. For example, the pool management table 143 is a table that allows determination as to whether the physical address in the SSD 120 has been allocated by setting "O" in a case where the target physical address has not been allocated, and setting "1" in a case where the target physical address has been allocated.

Next, the program section 150 will be described. The program section 150 in which the storage control contents are described as software is configured to include a plurality of programs.

The volume management program 151 newly adds a new volume to the volume management table 141 when the management server 20 gives an instruction to generate a new volume. When adding a new volume, the volume management program 151 sets the instructed logical capacity to the logical capacity 1412, sets "0" to the allocation amount 1413, and sets the instructed volume type 1414.

The read/write program 152 performs I/O control in accordance with read and write I/O issued by the APP/DB servers 10 and 30.

In a case where a write command for a logical block is issued in an initial state (physical address 1422 in the logical-physical conversion table 142 is in an INVALID state), the read/write program 152 first refers to the pool management table 143. Then, the read/write program 152 selects an unallocated physical block in the SSD 120, and associates a logical block number and the physical block by using the logical-physical conversion table 142 (physical block validation).

Then, the read/write program 152 stores data in the target physical block. In a case where a read command for a logical block is issued, if a target physical block is valid, the read/write program 152 transmits, as a response, data stored in the target physical block to the APP/DB server 10 or the APP/DB server 30.

In a case where the target physical block is invalid (no data is stored), the read/write program 152 executes a different process for each volume type. In a case where the volume type is a standard volume or a snapshot volume, the read/write program 152 transmits, as a response, an error response to the APP/DB servers 10 and 30 because the access block is originally invalid data.

On the other hand, in a case where the volume type is a virtual volume, the read/write program 152 fetches data from the first storage system 100 and stores the data in the virtual volume 330. At the same time, the read/write program 152 transmits, as a response, target data to the APP/DB server 10 or the APP/DB server 30. As described above, the read/write program 152 controls a standard I/O process.

In a case where an instruction to generate a snapshot of a volume designated by the APP/DB server 10 or the management server 20 is received, the snapshot program 153 adds a snapshot volume onto the volume management table 141. In creating a snapshot, there are a method of duplicating the logical-physical conversion table 142 with the data itself and a method of duplicating only the logical-physical conversion table 142, but any method may be used.

The first prefetch program 154 is a program that detects a difference between two snapshots and transfers the difference to the second storage system 300. For example, a difference between the snapshot (Generation 1) 133 and the snapshot (Generation 2) 134 in FIG. 3 is a logical block B. The first prefetch program 154 transfers the logical block B as difference data to the second storage system 300.

Here, the difference data will be described with reference to FIGS. 3 and 4. In FIG. 3, it is assumed that a snapshot at the end of the previous month is stored in the snapshot (Generation 1) 133, and a snapshot at the end of this month is stored in the snapshot (Generation 2) 134. In FIG. 4, the difference data in this case means history data (history data with order dates of 2/1, 2/2, and 2/3 for this month) added during one month and update portions (customer information of A0 and A4, and supplier information of C1 and C4) of the history data and the master data.

Data Retained in Second Storage System 300 According to Embodiment

FIG. 14 is a diagram for explaining data retained in the memory 115 in the second storage system 300 according to the embodiment.

In addition to each table in the control information section 140 of the first storage system described above, a control information section 170 includes an access history table 174 (FIG. 15) to be described later and a discard entry list 178 that is a list of data entries to be discarded from the virtual volume.

The program section 180 is a processing program of the second storage system 300. The program section 180 stores the volume management program 151, the read/write program 152, and a second prefetch program 184 to be described later. The program section 180 further stores an access history acquisition program 185, a virtual volume discard entry estimation program 186, and a data discard program 187.

A cache section 160 has a function equivalent to that of the cache section 160 of the first storage system 100.

Access History Table 174 According to Embodiment

Figure 15:
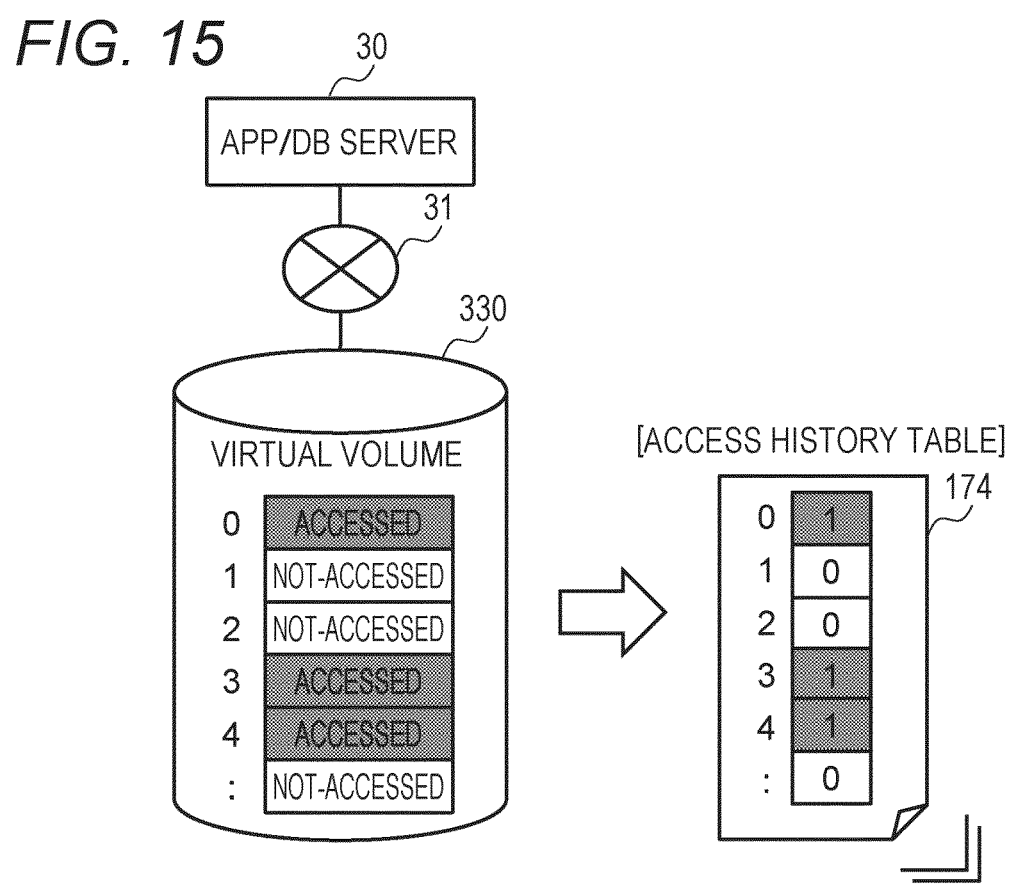
FIG. 15 is a diagram for explaining an access history table according to the embodiment.

FIG. 15 is a diagram for explaining the access history table 174 according to the embodiment.

The access history table 174 is a table indicating whether or not the APP/DB server 30 has accessed a specific area of the virtual volume 330. The access history table is time series data in which execution of the batch process for each predetermined period (for example, one month) by the APP/DB server 30 is set as a unit.

In the present embodiment, in order to facilitate the description, the unit of the access area is set to a logical block size (8 KB in Linux (registered trademark) or the like). As illustrated in FIG. 15, in the access history table 174, "0" indicating no access is set by default, and "1" indicating being accessed is set in a case where there is an access to the target block. The access history table 174 has a plurality of sets.

State Transition of Access History Table 174 According to Embodiment

Figure 16:
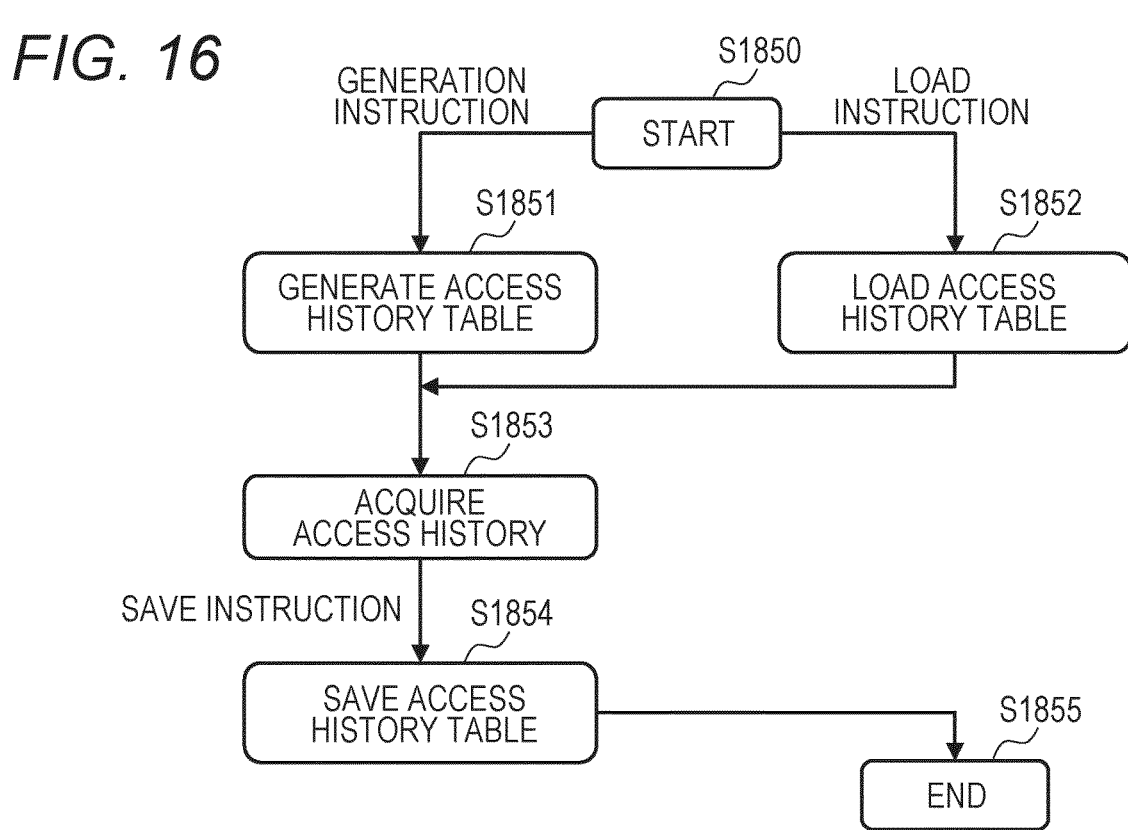
FIG. 16 is a diagram for explaining a state transition of the access history table according to the embodiment.

FIG. 16 is a diagram for explaining the state transition of the access history table 174 according to the embodiment.

First, when an instruction to generate the access history table 174 is issued from the management server 20 in an IDLE state (S1850), the access history acquisition program 185 transitions to an access history table generation state (S1851). In the access history table generation state, the access history acquisition program 185 generates a new access history table 174 to which a unique table identifier is assigned. In the new access history table 174, "0" indicating an initial state (not-accessed) is set. The access history acquisition program 185 transmits, as a response, the table identifier assigned to the new access history table 174 to the management server 20. Thereafter, the access history acquisition program 185 transitions to an access history acquisition state (S1853).

Alternatively, when an instruction to load the access history table 174 (to assign the table identifier) is issued from the management server 20 in the IDLE state (S1850), the access history acquisition program 185 transitions to an access history table load state (S1852). In the access history table load state, the access history acquisition program 185 loads the access history table 174 corresponding to the table identifier, and transitions to the access history acquisition state (S1853).

In the access history acquisition state (S1853), each time there is an access to the virtual volume 330 by the APP/DB server 30, the access history acquisition program 185 sets a table value "1" in a corresponding logical block of the access history table 174. Here, the access history table 174 in which the table value "1" is set is generated in S1851 or loaded in S1852.

When a save instruction is issued from the management server 20 in the access history acquisition state (S1853), the access history acquisition program 185 transitions to an access history table save state (S1854). In the access history table save state (S1854), the access history acquisition program 185 stores a pair of the current table identifier and the access history table 174, and transitions to an end state (S1855).

As described above, in the present embodiment, a method in which a plurality of sets of access histories in a specific period can be stored according to an instruction from the management server 20 is obtained. The functions related to the plurality of sets of access history table 174 are processed by the access history acquisition program 185 in the program section 180.

Next, other programs of the second storage system 300 will be described. The second prefetch program 184 executes a process paired with the first prefetch program 154 processed by the first storage system 100. The second prefetch program 184 allocates the transfer data transferred by the first prefetch program 154 to the virtual volume 330.

As mentioned in the description of the first prefetch program 154, the transfer data is difference data, and is the history data added during one month and the update portion of the history data and the master data.

Figure 17:
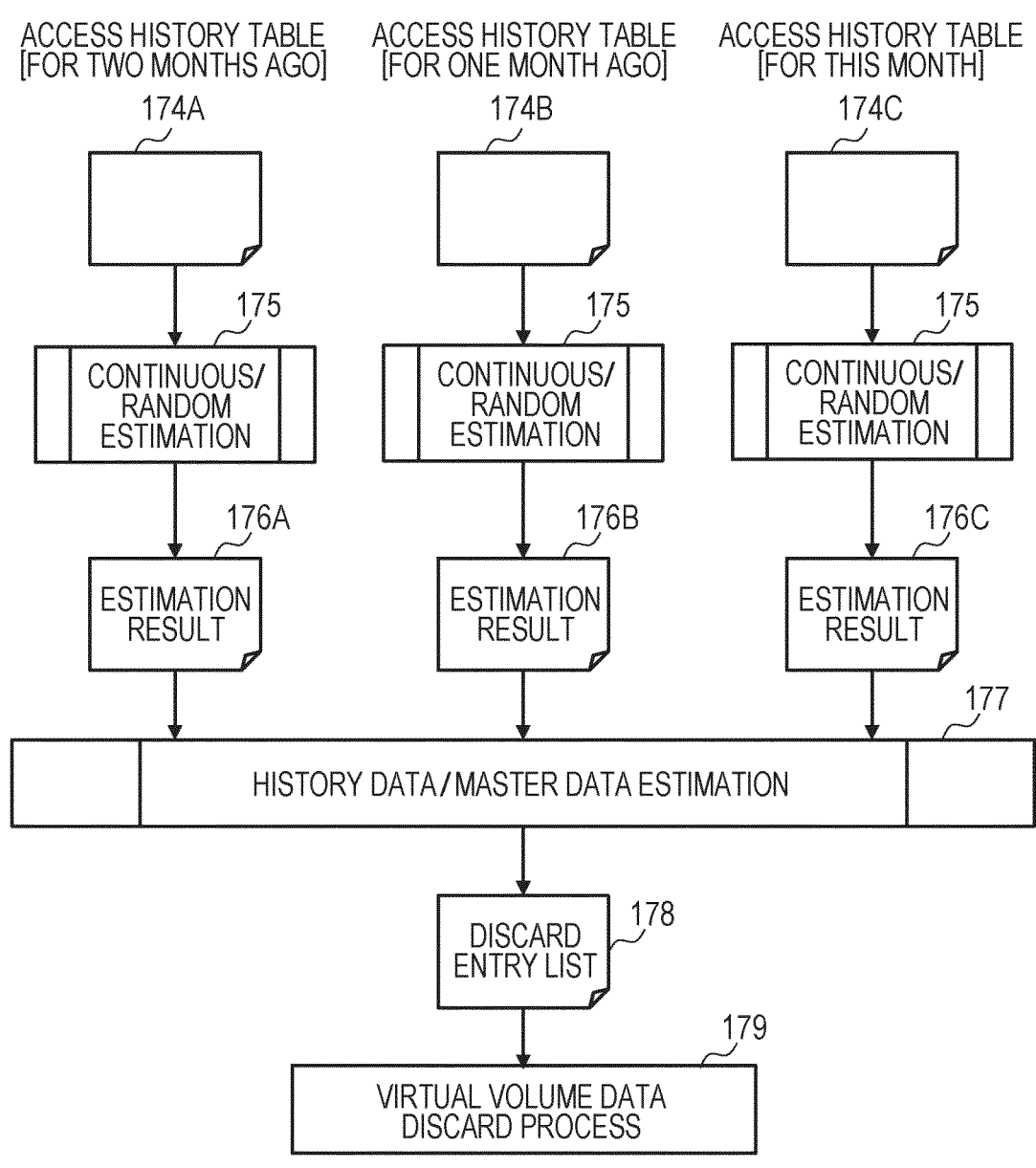
FIG. 17 is a diagram illustrating an example of an operation of a virtual volume discard entry estimation program according to the embodiment.

Operation of Virtual Volume Discard Entry Estimation Program 186 According to Embodiment FIG. 17 is a diagram illustrating an example of an operation of the virtual volume discard entry estimation program 186 according to the embodiment.

As illustrated in the description of the access history table 174 in FIGS. 15 and 16, the access history table 174 can store a plurality of sets acquired at a plurality of execution timings (for example, in the case of a monthly batch, three execution timings of two months ago, one month ago, and this month). Therefore, the virtual volume discard entry estimation program 186 performs continuous/random estimation 175 on an access history table (for two months ago) 174A, an access history table (for one month ago) 174B, and an access history table (for this month) 174C. Then, the virtual volume discard entry estimation program 186 generates estimation results 176A, 176B, and 176C of the continuous/random estimation 175. Details of the continuous/random estimation 175 will be described later.

The access history table (for two months ago) 174A is an example of a third access history. The access history table (for one month ago) 174B is an example of a second access history. The access history table (for this month) 174C is an example of a first access history.

Here, the access history table (for two months ago) 174A is obtained two months ago. The access history table (for one month ago) 174B is obtained one month ago. The access history table (for this month) 174C is obtained after the latest data processing program 32 of this month is executed.

The virtual volume discard entry estimation program 186 performs history data/master data estimation 177 to be described later by using, as an input, the estimation results 176A, 176B, and 176C, and generates a discard entry list 178 that is a list of data entries to be discarded from the virtual volume.

Finally, in a virtual volume data discard process 179, the virtual volume discard entry estimation program 186 discards the data described in the discard entry list 178 from the virtual volume 330, and deletes the entry of the discarded data from the discard entry list 178.

Continuous/Random Estimation 175 According to Embodiment

FIG. 18 is a diagram for explaining a processing function of continuous/random estimation 175 (FIG. 17) according to the embodiment.

Table 175T in FIG. 18 is information for estimating the state of a logical block N based on the access statuses of an Nth logical block (logical block N) and a (N+1)th logical block (logical block (N+1)).

The logical block N and the logical block (N+1) in the table 175T indicate values (not accessed or accessed) of the Nth logical block and the (N+1)th logical block stored in the access history table 174. In a combination of these values, a state of the logical block N is indicated. For example, in a case where the values of the logical block N and the logical block (N+1) are both "not-accessed", it indicates that at least the logical block N is estimated to be "not-accessed block". In this case, the estimation result of the continuous/random estimation 175 indicates that the access type is the not-accessed block (no access). "Not-accessed block" indicates that the area type is a not-accessed area.

In addition, in a case where the logical block N is "not-accessed" and the logical block (N+1) is "accessed", the logical block N is a block that is a random access area but has been intended to be accessed, and is estimated as a result "random block". Similarly, in a case where the logical block N is "accessed" and the logical block (N+1) is "not-accessed", it is also estimated as "random block". In this case, the estimation result of the continuous/random estimation 175 indicates that the access type is a random block (random access). "Random block" indicates that the area type is a random access area.

In a case where both the logical block N and the logical block (N+1) are "accessed", at least the logical block N is estimated to be accessed as "continuous block". In this case, the estimation result of the continuous/random estimation 175 indicates that the access type is "continuous block (continuous access)". "Continuous block" indicates that the area type is a continuous access area.

The virtual volume discard entry estimation program 186 performs such estimation on all the access areas of the access history table 174 and outputs the estimation result 176.

History Data/Master Data Estimation 177 According to Embodiment

FIG. 19 is a diagram for explaining a function of the history data/master data estimation 177 according to the embodiment.

EMBODIMENT

Table 177T illustrated in FIG. 19 is information for estimating whether the target block is history data or master data in the database for the input combination of the estimation results 176A, 176B, and 176C. The access characteristics of the history data and the master data illustrated in FIG. 9 are considered for the input combination that is the estimation basis.

There are a total of 27 input combinations of the estimation results 176A, 176B, and 176C. For example, in a case where the estimation results 176A, 176B, and 176C are all "random block", referring to FIG. 9, it can be seen that the estimation results are features of the master data (master data of (b) in FIG. 9) with an index. As a result, it is determined as "master data".

For example, in a case where the estimation results 176A, 176B, and 176C are all "continuous block", referring to FIG. 9, it can be seen that the estimation results are features of the master data (master data of (c) in FIG. 9) with no index. As a result, it is determined as "master data".

As described above, most of the combinations can be estimated as the master data.

On the other hand, a case where it cannot be determined as the master data will be described.

In a case where all the estimation results 176A, 176B, and 176C are "not-accessed block", it can be determined as "history data three months ago" (corresponding to (Condition A) in (a) of FIG. 9) or "old master data" (corresponding to (d) of FIG. 9). As a result, it can be determined as at least "not-accessed", but it cannot be determined whether the data is the history data or the master data. Here, both "history data three months ago" and "old master data" are data that is unlikely to be referred to in the data processing program 32 of the next month.

Next, it is assumed that the estimation result 176A two months ago is "continuous block", the estimation result

176B one month ago is "not-accessed", and the estimation result 176C of this month is "not-accessed". In this case, there is a probability of "history data two months ago" (corresponding to (Condition B) in (a) of FIG. 9) or "master data" (two months ago corresponds to (c) in FIG. 9, and one month ago and this month correspond to (d)).

Further, it is assumed that the estimation result 176A two months ago is "not-accessed", the estimation result 176B one month ago is "continuous access", and the estimation result 176C of this month is "not-accessed". In this case, there is a probability of "history data one month ago" (corresponding to (Condition C) in (a) of FIG. 9) or "master data" (two months ago and this month correspond to (d) in FIG. 9, and one month ago corresponds to (c)).

Further, it is assumed that the estimation result 176A two months ago and the estimation result 176B one month ago are "not-accessed", and the estimation result 176C of this month is "continuous access". In this case, there is a probability of "history data of this month" (corresponding to (Condition D) in (a) of FIG. 9) or "master data added this month" (two months ago and one month ago correspond to (d) in FIG. 9, and this month corresponds to (c)).

Finally, if any one of the estimation result 176A two months ago, the estimation result 176B one month ago, and the estimation result 176C of this month is a random access, a continuous access or not-access may occur in other months. Thus, in a case where there is even one random access, the data can be classified into the master data of (b) in FIG. 9.

In the present embodiment, the data to be discarded from the virtual volume 330 is (Condition A) the history data three months ago, (Condition B) the history data two months ago, (Condition C) the history data one month ago, and (Condition D) not-referred master data (random data without an access). The history data one month ago is past data corresponding to a period immediately before the history data of this month which is the latest data in time series. The history data two months ago is past data that corresponds to a period before one from the history data one month ago in time series, and corresponds to a period before two from the history data of this month in time series. The history data three months ago is past data that corresponds to a period before one from the history data two months ago in time series, corresponds to a period before two from the history data one month ago in time series, and corresponds to a period before three from the history data of this month in time series.

As a result, if the estimation results of the history data and the master data include data corresponding to any one of these conditions, it is determined to discard the data even in a case where there is a probability of other data. That is, data that may correspond to (Condition A), (Condition B), (Condition C), and (Condition D) is discarded.

As described above, when the data may correspond to (Condition A), (Condition B), (Condition C), and (Condition D), and thus is estimated as discard data, the logical block numbers corresponding to the conditions are listed and stored as the discard entry list 178.

Virtual Volume Data Discard Process According to Embodiment

Figure 20:
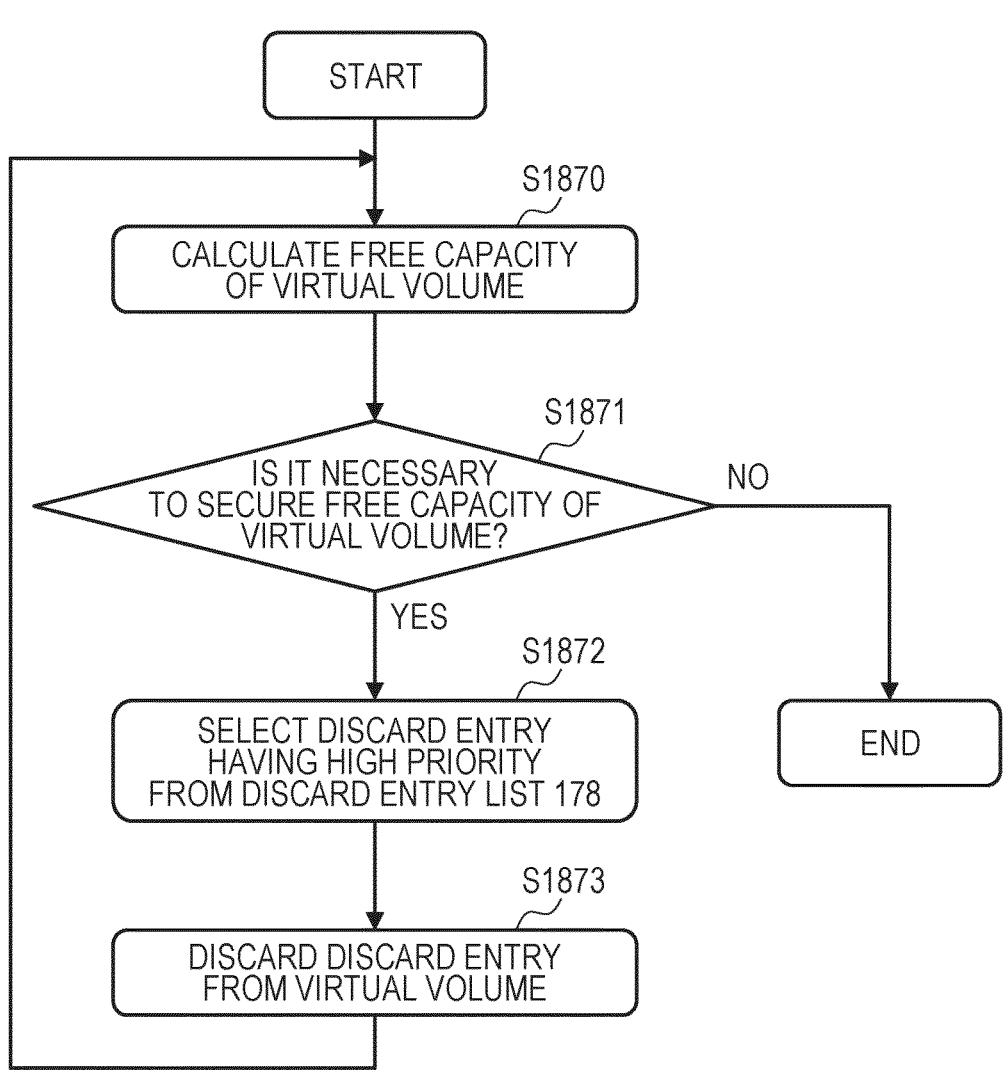
FIG. 20 is a flowchart illustrating a virtual volume data discard process according to the embodiment.

FIG. 20 is a flowchart illustrating a virtual volume data discard process according to the embodiment.

First, in Step S1870, the data discard program 187 calculates the free capacity of the virtual volume 330. In the virtual volume data discard process, the data discard program 187 can calculate by comparing the actual allocation amount 1413 with the allocation threshold value 1415 indicated in the volume management table 141.

Then, in Step S1871, the data discard program 187 determines whether it is necessary to secure more free capacity from the actual allocation amount 1413 of the virtual volume and the free capacity. In a case where it is necessary to secure the free capacity (Yes in Step S1871), the data discard program 187 moves the process to Step S1872. On the other hand, the data discard program 187 ends the virtual volume data discard process in a case where it is not necessary to secure the free capacity (No in Step S1871).

In Step S1872, in a case where there are a plurality of discard entries (discard data) in the discard entry list 178, the data discard program 187 selects s discard entry in descending order of priority. That is, in Step S1872, the data discard program 187 searches the discard entry list 178, and first, selects the discard entry in the order of the priorities of (Condition B), (Condition C), and (Condition D) with (Condition A) as the highest priority.

Then, in Step S1873, the data discard program 187 discards the discard entry selected in Step S1872 from the virtual volume 330 and deletes the discard entry from the discard entry list 178. When Step S1873 ends, the data discard program 187 returns the process to Step S1870. The data discard program 187 repeats the processes of Steps S1870 to S1873 until the sufficient free capacity is available in the virtual volume 330 (No in Step S1871).

The priority order of (Condition A), (Condition B), (Condition C), and (Condition D) is fixed in the above description, but the priority order may be changed in accordance with the needs of a user or may be dynamic.

Figure 21:
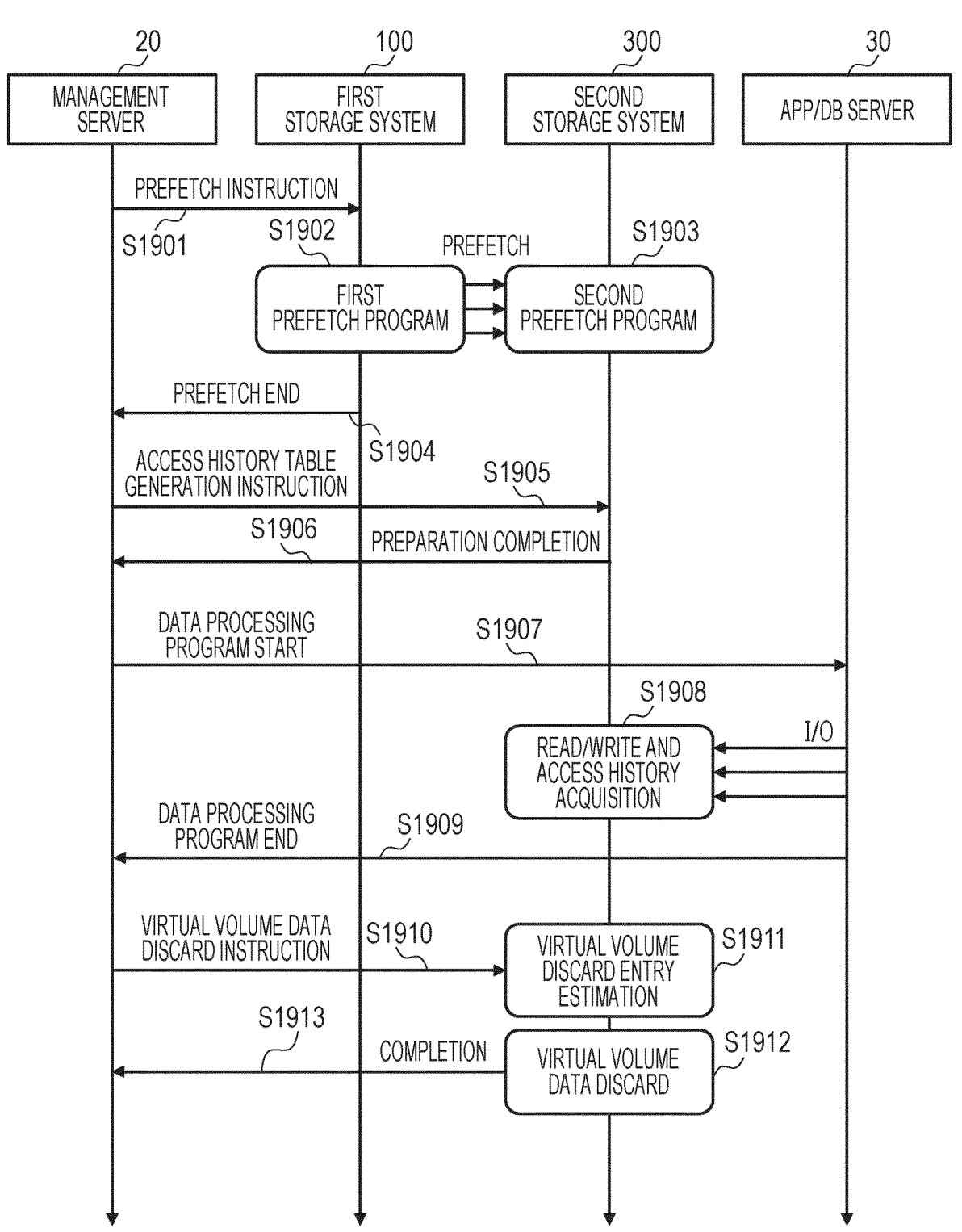
FIG. 21 is a diagram for explaining a sequence related to the execution of the data processing program according to the embodiment.

Sequence Related to Execution of Data Processing Program 32 According to Embodiment FIG. 21 is a diagram for explaining a sequence related to the execution of the data processing program 32 according to the embodiment. As illustrated in FIG. 10, at the start of execution of the data processing program 32, a snapshot for this month is determined in the on-premises side resource 1.

First, in Step S1901, the management server 20 transmits a prefetch instruction to the first storage system 100. Then, in Step S1902, the first storage system 100 transmits history data, and update data of the history data and the master data added for one month to the second storage system 300 by the first prefetch program 154.

Then, in Step S1903, the second storage system 300 executes the second prefetch program 184, and allocates the data transferred from the first storage system 100 in Step S1902 to the virtual volume 330. Next, in Step S1904, the first storage system 100 notifies the management server 20 that the prefetch process has been completed when the transmission of the update data to the second storage system 300 is completed and the first prefetch program 154 is ended.

Then, in Step S1905, the management server 20 instructs the second storage system 300 to generate the access history table 174 (transition to Steps S1851 and S1853 in FIG. 16). As a result, the current access history table 174 is determined. Next, in Step S1906, the second storage system 300 notifies the management server 20 that the current access history table 174 has been prepared.

Then, in Step S1907, the management server 20 instructs the APP/DB server 30 to start the data processing program 32. The APP/DB server 30 starts the data processing program 32 in response to the instruction in Step S1907. Then, in Step S1908, the second storage system 300 acquires the access history stored in the access history table 174 while controlling I/O by the read/write program 152 and the access history acquisition program 185. For example, in a case where Step S1908 is batch process, the access history stored in the access history table 174 is time-series data in units of execution of batch process.

Here, in a case where the data targeted by the I/O issued by the APP/DB server 30 is not on the virtual volume 330 (in a case where the data is invalid), the read/write program 152 fetches the target data from the first storage system 100. The read/write program 152 is stored in the virtual volume 330. At this time, in a case where the allocation amount 1413 of the virtual volume 330 (the data capacity stored in the virtual volume 330) exceeds the allocation threshold value 1415 and the virtual volume 330 is depleted, the discard entry is selected from the discard entry list 178 stored in the past. The target entry is discarded. In a case of discarding the target entry, Steps S1910 to S1913 are executed following Step S1909 described later.

In Step S1909, when the data processing program 32 ends, the APP/DB server 30 notifies the management server 20 of the end of the data processing program 32.

Then, in Step S1910, the management server 20 instructs the second storage system 300 to discard the data of the virtual volume 330. Then, in Step S1911, the second storage system 300 executes the virtual volume discard entry estimation program 186 to estimate a data entry to be discarded from the virtual volume 330.

Then, in Step S1912, the second storage system 300 executes the data discard program 187, and discards the data entry estimated to be discarded in Step S1911 from the virtual volume 330. Then, in Step S1913, the second storage system 300 notifies the management server 20 of the end of the data entry discard of the virtual volume 330.

In the above description, the access history acquisition program 185 acquires the access history stored in the access history table 174 in synchronization with the I/O issued from the APP/DB server 30. The acquisition of the access history only needs to be completed before the virtual volume discard entry estimation program 186 is started. Thus, the access history acquisition program 185 does not need to be completely synchronized with the I/O, and can be executed in an asynchronous manner. In this case, it is assumed that the virtual volume discard entry estimation program 186 is started after the access history acquisition program 185 is ended.

Modification Examples of Embodiment

In the virtual volume discard entry estimation program 186 described above, a random block or a continuous block is selected based on the logical block size in units of 8 KB. Regarding the logical block size of 8 KB, the capacity of the access history table 174 can be reduced by using a value more than 8 KB. Therefore, a size at a level at which a random block, a continuous block, or the like can be selected may be used as a management unit of the access history table 174.

In addition, in the embodiment, the method of estimating a discard entry by using the access history table 174 for three months has been described. A technical idea of this method is to generate the access history table 174 in units of the data processing program 32 executed on a monthly basis or the like, and to estimate a discard entry from the plurality of access history table 174.

For example, the history data of the previous month is unlikely to be accessed in this month, but when general access history management is performed, the history data is recognized as most recently used (MRU), and is hardly selected as a discard entry in general LRU-like management.

Therefore, in the present embodiment, a plurality of access history table 174 divided in time series are provided, and means for estimating the discard entry by using the plurality of access history table 174 is provided. Here, for the purpose of more accurate estimation, four sets (4 months) or more of the access history table 174 may be used. That is, the number of sets of the access history table 174 to be used is not limited.

In the present embodiment, the data discard program 187 is executed after the data processing program 32 ends (after Step S1909 (FIG. 21)). For example, even in a case where the virtual volume 330 is depleted before or during the execution of the second prefetch program 184 or the data processing program 32, the virtual volume data discard may be executed. In this case, the estimation and discard of the discard entry (discard data) of the virtual volume 330 may be performed by using the access history table 174 (for example, the latest access history table 174 created in the past or the access history table 174 currently being created) generated in the past. The timings of the estimation and discard of the discard entry are appropriately set by the user.

In the above-described embodiment, regarding the virtual volume discard entry estimation program 186, the estimation method of the discard entry (discard data) by the fixed determination means illustrated in the description of FIGS. 18 and 19 has been described. The fixed determination means varies depending on the application. As a result, in accordance with the use purpose of the virtual storage, an estimation algorithm that outputs an estimation result of the discard entry different from that of the present embodiment by using a plurality of access history table 174 as an input may be used.

The processor 114 of the second storage system 300 may perform machine learning using, as learning data, a plurality of access history table 174 and discard entries (discard data). The processor 114 may generate a discard entry estimation model that outputs a discard entry using the plurality of access history table 174 as an input by the machine learning. The processor 114 estimates the discard entry by using the discard entry estimation model. Further, the processor 114 may update the discard entry estimation model as needed along with the accumulation of the learning data.

Effects of Embodiment

In the present embodiment, by using the virtual volume 330 of the cloud side resource 3 having a small capacity with respect to the logical volume 130 of the on-premises side resource 1, it is possible to reduce the capacity of the cloud storage of the cloud side resource 3, and to reduce capacity charging. In addition, according to the present embodiment, the data transfer from the cloud side resource 3 to the on-premises side resource 1 is unnecessary, and thus it is possible to reduce the network cost.

In the present embodiment, the plurality of access histories (access history tables 174A, 174B, and 174C) are, for example, time-series data in units of batch execution. As a result, in a case where the secondary use of data on the APP/DB server 30 side is the batch process, data is discarded for each piece of data in units of the process, so that it is possible to efficiently perform the capacity management of data in accordance with the form of the secondary use of data.

In the present embodiment, it is determined that the data in the access area corresponding to the not-accessed area is discarded from the virtual volume at a predetermined number of execution timings. Further, even in a case where there is a history of an access to the access history at the execution timing, it is determined that the data in the access area corresponding to the not-accessed area is discarded from the virtual volume at a predetermined number of execution timings. This predetermined number changes in accordance with the type of access in a case where there is an access. Then, in a case where the type of access is a random access, the predetermined number for determining that the data in the access area corresponding to the not-accessed area is discarded from the virtual volume at a predetermined number of execution timings is a larger value than that in a case of a continuous access. That is, the number of execution timings to be determined as the not-accessed area is large. As a result, it is possible to control the data in the access area of the random access to be less likely to be discarded from the virtual volume as compared with the data in the access area of the continuous access.

In the present embodiment, the priority is given to the discard data in the priority order of (Condition A) (Condition B) (Condition C) (Condition D), and the discard data is discarded in descending order of priority. As a result, since the discard of data having a higher necessity is suppressed as much as possible, it is possible to reduce waste such as re-acquisition of data and re-storage to the virtual volume. In addition, it is possible to appropriately discard the data in accordance with the needs of the user.

In the present embodiment, necessary data that is not provided in the virtual volume 330 is acquired by transparently accessing the on-premises first storage system 100. As a result, even when data necessary for the process related to the secondary use of the APP/DB server 30 is discarded from the virtual volume 330, it is possible to re-acquire the data and continue the process.

In addition, in the present embodiment, in a case where the data capacity of the virtual volume 330 exceeds the threshold value, the discard data is estimated and discarded at any timing before, during, and after the execution of the process related to the secondary use of the APP/DB server 30. As a result, it is possible to appropriately suppress an increase in the data capacity of the virtual volume 330 in accordance with the needs of the user.

In the present embodiment, difference data between snapshots is transmitted as update data from the on-premises first storage system 100 to the virtual volume 330 of the second storage system 300. As a result, it is possible to efficiently transmit the update data to the virtual volume 330 by using the snapshot, and to reduce the pressure about the data capacity of the virtual volume 330.

In the present embodiment, discard data is estimated by the discard entry estimation model obtained by performing machine learning of a plurality of the access histories and the discard entries. As a result, it is possible to model the rule-based discard entry estimation based on FIGS. 9, 18, and 19 and to efficiently perform the discard entry estimation by using the discard entry estimation model.

Although the embodiment according to the present disclosure has been described above in detail, the present disclosure is not limited to the above-described embodiment, and various modifications can be made without departing from the gist of the present disclosure. For example, the above-described embodiment has been described in detail in order to describe the present invention in an easy-to-understand manner, and are not necessarily limited to those having all the described configurations. Further, a part of the configuration of above-described embodiment can be added to, deleted from, or replaced with another configuration.

In addition, some or all of the above-described configurations, functional units, processing units, and the like may be realized by hardware, for example, by designing with an integrated circuit. In addition, each of the above-described configurations, functions, and the like may be realized by software by a processor interpreting and executing a program for realizing each function. Information such as a program, a table, and a file for realizing each function can be stored in a storage device such as a memory, an HDD, or an SSD, or a recording medium such as an IC card, an SD card, or a DVD.

In the above-described drawings, the control lines and the information lines indicate what is considered to be necessary for the description, and do not necessarily indicate all the control lines and the information lines on the implementation. For example, it may be considered that almost all the configurations are actually connected to each other.

In addition, the above-described processing functions and arrangement forms of data are merely examples. The arrangement form of each processing function and data can be changed to an optimum arrangement form from the viewpoint of performance of hardware and software, processing efficiency, communication efficiency, and the like.

What is claimed is:

1. A computer system comprising:
a first storage system that is disposed in a first base and provides a logical volume to a first server; and
a second storage system that is disposed in a second base and is connected to the first storage system via a network, wherein
the first storage system includes a first processor and a memory,
the second storage system includes a second processor and a memory,
the first processor is configured to:
store data related to execution of the first server in the logical volume, and
transmit the data stored in the logical volume to the second storage system,
the second processor is configured to:
provide a virtual volume to a second server by the second storage system,
store the data received from the first processor in the virtual volume,
execute a process by using the data stored in the virtual volume at each execution timing,
determine whether the data stored in the virtual volume is left in the virtual volume or discarded based on presence or absence of an access and a type of access which are access statuses to the data at each execution timing, and
discard the data determined to be discarded from the virtual volume, the data is stored in each access area of the virtual volume, and
the second processor is further configured to:
determine which of a continuous access or a random access the type of access corresponds to for each access area, and determine whether the data is left in the virtual volume or is discarded based on the presence or absence of the access in each access area and the type of access.

2. The computer system according to claim 1, wherein the second processor is further configured to determine whether the data is left in the virtual volume or discarded based on the presence or absence of the access to the data at each of a plurality of the execution timings and the type of access.

3. The computer system according to claim 1, wherein the second processor is further configured to:
acquire target data from the logical volume of the first storage system, and
store the target data in the virtual volume in a case where the target data requested to be accessed by the second server is determined to be discarded, and thus is discarded from the virtual volume and does not exist.

4. The computer system according to claim 1, wherein the second processor is further configured to determine whether the data stored in the virtual volume is left in the virtual volume or is discarded in a case where a capacity of the data stored in the virtual volume exceeds a threshold value.

5. The computer system according to claim 1, wherein the first processor is further configured to generate a snapshot of the data at each predetermined period, and
the second processor is further configured to acquire difference data between snapshots of each of the predetermined consecutive periods, as the data at each of the predetermined periods.

6. A computer system comprising:
a first storage system that is disposed in a first base and provides a logical volume to a first server; and
a second storage system that is disposed in a second base and is connected to the first storage system via a network, wherein
the first storage system includes a first processor and a memory,
the second storage system includes a second processor and a memory,
the first processor is configured to:
store data related to execution of the first server in the logical volume, and
transmit the data stored in the logical volume to the second storage system,
the second processor is configured to:
provide a virtual volume to a second server by the second storage system,
store the data received from the first processor in the virtual volume,
execute a process by using the data stored in the virtual volume at each execution timing,
determine whether the data stored in the virtual volume is left in the virtual volume or discarded based on presence or absence of an access and a type of access which are access statuses to the data at each execution timing, and
discard the data determined to be discarded from the virtual volume, the data is stored in each access area of the virtual volume, the second processor is further configured to:
determine which of a continuous access or a random access the type of access corresponds to for each access area, and
determine whether the data is left in the virtual volume or is discarded based on the presence or absence of the access in each access area and the type of access, and wherein the process is a batch process at each execution timing.

7. The computer system according to claim 6, wherein the second processor is further configured to:

record an access status in each access area of the data when the batch process is executed at a plurality of the execution timings as an access history, and determine whether the data is left in the virtual volume or is discarded based on the access history at a plurality of execution timings in consecutive time series.

8. The computer system according to claim 7, wherein the second processor is further configured to determine that the data in the access area corresponding to a not-accessed area is discarded from the virtual volume at a predetermined number of the execution timings.

9. The computer system according to claim 8, wherein the second processor is further configured to determine that the data in the access area corresponding to the not-accessed area is discarded from the virtual volume at the predetermined number of the execution timings even in a case where there is a history of an access to the access history at the execution timing, the predetermined number changes in accordance with the type of access in a case where there is the access, and in a case where the type of the access is a random access, the predetermined number for determining that the data in the access area corresponding to the not-accessed area is discarded from the virtual volume at the predetermined number of the execution timings is larger than that in a case of a continuous access.

10. The computer system according to claim 7, wherein the second processor is further configured to:

generate a discard entry estimation model that receives, as an input, the access history at each of a plurality of the execution timings and outputs data to be discarded by machine learning using, as learning data, the access history at each of the plurality of the execution timings and the data determined to be discarded based on the access history, and determine the data to be discarded based on an output obtained by inputting the access history at each of the plurality of the execution timings to the discard entry estimation model.

11. A data management method in a storage system, which is performed by a computer system including a first storage system that is disposed in a first base and provides a logical volume to a first server, and a second storage system that is disposed in a second base and is connected to the first storage system via a network, wherein the first storage system includes a first processor and a memory, the second storage system includes a second processor and a memory, and the data management method comprises:

by the first processor, storing data related to execution of the first server in the logical volume; and transmitting the data stored in the logical volume to the second storage system, and by the second processor, providing a virtual volume to a second server by the second storage system;

storing the data received from the first processor in the virtual volume;

executing a process by using the data stored in the virtual volume at each execution timing;

determining whether the data stored in the virtual volume is left in the virtual volume or discarded based on presence or absence of an access and a type of access which are access statuses to the data at each execution timing; and discarding the data determined to be discarded from the virtual volume, wherein the data is stored in each access area of the virtual volume, and the data management method further comprises:

by the second processor, determining which of a continuous access or a random access the type of access corresponds to for each access area, and determining whether the data is left in the virtual volume or is discarded based on the presence or absence of the access in each access area and the type of access.

* * * * *